(12) United States Patent
Thomas et al.

(10) Patent No.: US 6,856,945 B2
(45) Date of Patent: Feb. 15, 2005

(54) METHOD AND APPARATUS FOR IMPLEMENTING PROJECTIONS IN SINGAL PROCESSING APPLICATIONS

(75) Inventors: John K. Thomas, Erie, CO (US); Anand P. Narayan, Boulder, CO (US)

(73) Assignee: TensorComm, Inc., Westminster, CO (US)

(*) Notice: Subject to any disclaimer, the term of this patent is extended or adjusted under 35 U.S.C. 154(b) by 352 days.

(21) Appl. No.: 09/988,219

(22) Filed: Nov. 19, 2001

(65) Prior Publication Data

US 2004/0030534 A1 Feb. 12, 2004

Related U.S. Application Data

(60) Provisional application No. 60/326,199, filed on Oct. 2, 2001, provisional application No. 60/325,215, filed on Sep. 28, 2001, and provisional application No. 60/251,432, filed on Dec. 4, 2000.

(51) Int. Cl.[7] .......................... G06F 15/00; H04B 15/00
(52) U.S. Cl. ...................... 702/189; 702/196; 370/208
(58) Field of Search .............................. 702/32, 66, 73, 702/126, 189–191, 193–196; 708/520, 523, 670; 455/101, 132–137; 370/208, 209, 335

(56) References Cited

U.S. PATENT DOCUMENTS

| | | | |
|---|---|---|---|
| 5,343,493 A | 8/1994 | Karimullah | 375/130 |
| 5,644,592 A | 7/1997 | Divsalar et al. | 375/147 |
| 5,787,130 A | 7/1998 | Kotzin et al. | 375/346 |
| 5,812,086 A | 9/1998 | Bertiger et al. | 342/357.06 |
| 5,844,521 A | 12/1998 | Stephens et al. | 342/357.1 |
| 5,872,540 A | 2/1999 | Casabona et al. | 342/362 |
| 5,872,776 A | 2/1999 | Yang | 370/342 |
| 5,926,761 A | 7/1999 | Reed et al. | 455/440 |
| 5,930,229 A | 7/1999 | Yoshida et al. | 370/203 |
| 5,953,369 A | 9/1999 | Suzuki | 375/148 |
| 6,002,727 A | 12/1999 | Uesugi | 375/346 |
| 6,014,373 A | 1/2000 | Schilling et al. | 370/342 |
| 6,088,383 A | 7/2000 | Suzuki et al. | 375/148 |
| 6,101,385 A | 8/2000 | Monte et al. | 455/427 |
| 6,104,712 A | 8/2000 | Robert et al. | 370/389 |
| 6,115,409 A | 9/2000 | Upadhyay et al. | 375/144 |
| 6,127,973 A | 10/2000 | Choi et al. | 342/378 |
| 6,131,013 A | 10/2000 | Bergstrom et al. | 455/63.1 |
| 6,137,788 A | 10/2000 | Sawahashi et al. | 370/342 |
| 6,141,332 A | 10/2000 | Lavean | 370/335 |
| 6,154,443 A | 11/2000 | Huang et al. | 370/210 |
| 6,157,685 A | 12/2000 | Tanaka et al. | 375/346 |
| 6,157,847 A | 12/2000 | Buehrer et al. | 455/561 |
| 6,166,690 A | 12/2000 | Lin et al. | 342/383 |
| 6,172,969 B1 | 1/2001 | Kawakami et al. | 370/342 |
| 6,175,587 B1 | 1/2001 | Madhow et al. | 375/148 |
| 6,192,067 B1 | 2/2001 | Toda et al. | 375/144 |
| 6,201,799 B1 | 3/2001 | Huang et al. | 370/342 |
| 6,215,812 B1 | 4/2001 | Young et al. | 375/144 |
| 6,219,376 B1 | 4/2001 | Zhodzishsky et al. | 375/148 |
| 6,222,828 B1 | 4/2001 | Ohlson et al. | 370/320 |
| 6,230,180 B1 * | 5/2001 | Mohamed | 708/523 |

(List continued on next page.)

OTHER PUBLICATIONS

Behrens, R.T., L.L. Scharf, "Parameter Estimation in the Presence of Low–Rank Noise", Proceedings of the Twenty–second Asilomar Conference on Signals, Systems, and Computers, Pacific Grove, CA, Nov. 1988.

(List continued on next page.)

Primary Examiner—Marc S. Hoff
Assistant Examiner—Manuel L. Barbee
(74) Attorney, Agent, or Firm—Steven J. Shattil

(57) ABSTRACT

A novel method and apparatus is provided for enabling the computation of a signal in a certain subspace, its projection that lies outside the subspace, and the orthogonal basis for a given matrix. More particularly, the present invention relates to the use of such a method or apparatus for real-time hardware applications since the method and apparatus may be utilized without matrix inversions or square root computations.

40 Claims, 19 Drawing Sheets

U.S. PATENT DOCUMENTS

| | | | |
|---|---|---|---|
| 6,233,229 B1 | 5/2001 | Ranta et al. | 370/330 |
| 6,233,459 B1 | 5/2001 | Sullivan et al. | 455/456.2 |
| 6,240,124 B1 | 5/2001 | Wiedeman et al. | 375/130 |
| 6,256,336 B1 | 7/2001 | Rademacher et al. | 375/140 |
| 6,259,688 B1 | 7/2001 | Schilling et al. | 370/342 |
| 6,278,726 B1 | 8/2001 | Mesecher et al. | 375/148 |
| 6,282,231 B1 | 8/2001 | Norman et al. | 375/144 |
| 6,282,233 B1 | 8/2001 | Yoshida | 375/148 |
| 6,285,316 B1 | 9/2001 | Nir et al. | 342/357.09 |
| 6,285,319 B1 | 9/2001 | Rose | 342/449 |
| 6,301,289 B1 | 10/2001 | Bejjani et al. | 375/144 |
| 6,308,072 B1 | 10/2001 | Labedz et al. | 455/448 |
| 6,317,453 B1 | 11/2001 | Chang | 375/140 |
| 6,321,090 B1 | 11/2001 | Soliman | 455/440 |
| 6,324,159 B1 | 11/2001 | Mennekens et al. | 370/203 |
| 6,327,471 B1 | 12/2001 | Song | 455/440 |
| 6,333,947 B1 | 12/2001 | Van Heeswyk et al. | 375/148 |
| 6,351,235 B1 | 2/2002 | Stilp | 342/357.06 |
| 6,351,642 B1 | 2/2002 | Corbett et al. | 455/442 |
| 6,359,874 B1 | 3/2002 | Dent | 370/342 |
| 2001/0003443 A1 | 6/2001 | Velazquez et al. | 342/367 |
| 2001/0020912 A1 | 9/2001 | Naruse et al. | 342/357.06 |
| 2001/0021646 A1 | 9/2001 | Antonucci et al. | 455/404.2 |
| 2001/0046266 A1 | 11/2001 | Rakib et al. | 375/259 |
| 2002/0001299 A1 | 1/2002 | Petch et al. | 370/350 |
| 2002/0176488 A1 * | 11/2002 | Kober et al. | 375/147 |

OTHER PUBLICATIONS

Best, Roland E., Phase Locked Loops: Design, Simulation, and Applications, 4$^{th}$ edition, McGraw Hill.

Cheng U., et al., "Spread–Spectrum Code Acquisition in the Presence of Doppler shift and data modulation", IEEE Transactions on Communications vol. 38, No. 2, Feb. 1990.

Duel–Hallen, Alexandra, "Decorrelating decision–feedback multiuser detector for synchronous code–division multiple-access channel", IEEE Trans. Common., vol. 41, No. 2, pp. 285–290, Feb. 1993.

Garg, V.K. et al., "Wireless and Personal Communications Systems", Prentice–Hall, 1996.

Iltis, Ronald A., et al., MultiUser Detection of Quasisynchronous CDMA signals using linear decorrelators, IEEE Transactions on Communications, vol. 44, No. 11, Nov. 1996.

Kaplan, Elliot D., Editor, UnderstandingGPS: Principles and Applications, Artech House.

Kohno, Ryuji and Mitsutoshi Hatori, "Cancellation techniques of co–channel interference in asynchronous spread spectrum multiple access systems", Electronics and Common. in Japan, vol. 66–A, No. 5, pp. 20–29, May 1983.

Lupas, Ruxandra and Sergio Verdu, "Linear multiuser detectors for synchronous code–division multiple–access channels", IEEE Trans. Info. Theory, vol. 35, No. 1, pp. 123–136, 1989.

Lupas, Ruxandra and Sergio Verdu, "Near–far resistance of multiuser detectors in asynchronous channels", IEEE Trans. Common., vol. 38, No. 4, pp. 496–508, Arp. 1990.

Mitra U., et al., "Adaptive Decorrelating Detectors for CDMA systems", Accepted for publication in the Wireless Personal Communications Journal, May 1995.

Mitra U., et. al., "Adaptive Receiver algorithms for NearFar Resistant CDMA", To appear in IEEE Tramsaction on Communications, Apr. 1995.

Price, R. and Green, P. E., Jr. "A Communication Technique for Multipath Channels," _Proc IRE_vol. 46, pp. 555–570, Mar., 1958.

Rapport, T.S., "Wireless Communications, Principles and Practice", Prentice–Hall, 1996.

Scharf L.L., B. Friedlander, Matched Subspace Detectors, IEEE Trans Signal Proc SP–42:8,pp. 2146–2157 (Aug. 1994).

Scharf, L.L., Statistical Signal Processing: Detection, Estimation, and Time Series Analysis, Addison–Wesley Publishing Co., 1991.

Schlegel, C. et. al., "Coded Asynchronous CDMA and its Efficient Detection", IEEE Transactions on Information Theory, vol. 44, No. 7, Nov. 1998.

Schlegel, C. et. al., "Projection Receiver: A New Efficient Multi–User Detector", IEEE 1995.

Schlegel, C., Zengjun Xiang, "A new projection receiver for coded Synchronous Multi–User CDMA Systems".

Schneider, Kenneth S., "Optimum detection of code division multiplexed signals", IEEE Trans. Aerospace and Electronic Systems, vol. AES–15, No. 1, pp. 181–185, Jan. 1979.

Stimson, G.W., "An Introduction to Airborne Radar", SciTech Publishing Inc., 1998.

Verdu, Sergio, "Minimum probability of error for asynchronous Gaussian multiple–access channels", IEEE Trans. Info. Theory, vol. IT–32, No. 1, pp. 85–96, Jan. 1986.

Viterbi, A.J., "CDMA, Principles of Spread Spectrum Communication", Addison Wesley, 1995.

Viterbi, Andrew J., "Very low rate convolutional codes for maximum theoretical performance of spread–spectrum multiple–access channels", IEEE J. Select. Areas Common., vol. 8, No. 4, pp. 641–649, May. 1990.

B. Widrow, S. Stearns, Adaptive Signal Processing, Prentice–Hall, Signal Processing Series, (1985).

Xie, Zhenhua, Robert T. Short and Craig K. Rushforth, "A family of suboptimum detectors for coherent multiuser communications", IEEE J. Select. Areas Common., vol. 8, No. 4, pp. 683–690, May 1990.

Zheng, Fu–Chun, et. al., "On the performance of Near–Far Resistant CDMA Detectors in the Presence of Synchronization Errors", IEEE Transactions on Communications, vol. 43, No. 12, Nov. 1995.

* cited by examiner

(PRIOR ART)

METHOD AND APPARATUS FOR IMPLEMENTING PROJECTIONS IN SINGAL PROCESSING APPLICATIONS

CROSS-REFERENCE TO RELATED APPLICATIONS

This application makes reference to U.S. Provisional Patent Application No. 60/326,199 entitled "Interference Cancellation in a Signal," filed Oct. 2, 2001; U.S. Provisional Patent Application No. 60/251,432, entitled "Architecture for Acquiring, Tracking and Demodulating Pseudorandom Coded Signals in the Presence of Interference," filed Dec. 4, 2000; U.S. patent application Ser. No. 09/612,602, filed Jul. 7, 2000; U.S. patent application Ser. No. 09/137,183, filed Aug. 20, 1998; U.S. Provisional Patent Application No. 60/325,215, entitled "An Apparatus for Implementing Projections in Signal Processing Applications," filed Sep. 28, 2001; U.S. Provisional Patent Application No. 60/331,480, entitled "Construction of an Interference Matrix for a Coded Signal Processing Engine," filed Nov. 16, 2001; and to U.S. patent application Ser. No. 09/988,218, entitled "Interference Cancellation in a Signal," filed Nov. 19, 2001. The entire disclosure and contents of these applications are hereby incorporated by reference.

BACKGROUND OF THE INVENTION

1. Field of the Invention

The present invention relates generally to a method and apparatus that enables the computation of a signal in a certain subspace, its projection that lies outside the subspace, and the orthogonal basis for a given matrix. More particularly, the present invention relates to the use of such a method or apparatus for real-time hardware applications since the method and apparatus may be utilized without matrix inversions or square root computations.

2. Description of the Prior Art

In spread spectrum systems, whether it is a communication system, a Global Positioning System (GPS) or a radar system, each transmitter may be assigned a unique code and in many instances each transmission from a transmitter is assigned a unique code. The code is nothing more than a sequence (often pseudorandom) of bits. Examples of codes include the Gold codes (used in GPS—see Kaplan, Elliot D., Editor, *Understanding GPS: Principles and Applications*, Artech House, 1996), Barker codes (used in radar—see Stimson, G. W., *"An Introduction to Airborne Radar"*, SciTech Publishing Inc., 1998), Walsh codes (used in communications systems like CDMAOne and CDMA2000—See IS-95 and IS2000 Standards). These codes may be used to spread the signal so that the resulting signal occupies some specified range of frequencies in the electromagnetic spectrum or the codes may be superimposed on another signal which might also be a coded signal.

Assigning a unique code to each transmitter allows the receiver to distinguish between different transmitters. An example of a spread spectrum system that uses unique codes to distinguish between transmitters is a GPS system.

If a single transmitter has to broadcast different messages to different receivers, such as a base-station in a wireless communication system broadcasting to different mobiles, one may use codes to distinguish between the messages for each mobile. In this scenario, each bit for a particular user is encoded using the code assigned to that user. By coding in this manner, the receiver, by knowing its own code, may decipher the message intended for it from the composite signal transmitted by the transmitter.

In some communication systems, a symbol is assigned to a sequence of bits that make up a message. For example, a long digital message may be grouped into sets of M bits and each one of these sets of M bits is a assigned to a symbol. For example, if M=6, then each set of 6 bits may assume one of $2^6$=64 possibilities. One such possibility is 101101. Such a system would broadcast a unique waveform, called a symbol, to indicate to the receiver the sequence of bits. For example, the symbol $\alpha$ might denote the sequence 101101 and the symbol $\beta$ might denote the sequence 110010. In the spread spectrum version of such a system, the symbols are codes. An example of such a communication system is the mobile to base-station link of CDMAOne or IS-95.

In some instances, such as in a coded radar system, each pulse is assigned a unique code so that the receiver is able to distinguish between the different pulses based on the codes.

Of course, all of these techniques may be combined to distinguish between transmitters, messages, pulses and symbols all in one single system. The key idea in all of these coded systems is that the receiver knows the codes of the message intended for it and by applying the codes correctly, the receiver may extract the message intended for it. However, such receivers are more complex than receivers that distinguish between messages by time and/or frequency alone. The complexity arises because the signal received by the receiver is a linear combination of all the coded signals present in the spectrum of interest at any given time. The receiver has to be able to extract the message intended for it from this linear combination of coded signals.

The following section presents the problem of interference in linear algebraic terms followed by a discussion of the current, generic (baseline) receivers.

Let H be a vector containing the spread signal from source no.1 and let $\theta_1$ be the amplitude of the signal from this source. Let $s_i$ be the spread signals for the remaining sources and let $\phi_i$ be the corresponding amplitudes. Suppose the receiver is interested in source number 1, the signals from the other sources may be considered to be interference. Then, the received signal is:

$$y = H\theta_1 + s_2\phi_2 + s_3\phi_3 + \ldots + s_p\phi_p + n \quad (1)$$

where n is the additive noise term, and p is the number of sources in the CDMA system. Let the length of the vector y be N, where N is the number of points in the integration window. This number N is selected as part of the design process as part of the trade-off between processing gain and complexity. A window of N points of y will be referred to as a segment.

In a wireless communication system, the columns of the matrix H represent the various coded signals and the elements of the vector $\theta$ are the powers of the coded signals. For example, in the base-station to mobile link of a CDMA-One system, the coded signals might be the various channels (pilot, paging, synchronization and traffic) and all their various multi-path copies from different base-stations. In the mobile to base-station link, the columns of the matrix H might be the coded signals from the mobiles and their various multi-path copies.

In a GPS system, the columns of the matrix H are the coded signals being broadcast by the GPS satellites at the appropriate code, phase and frequency offsets.

In an array application, the columns of the matrix are the steering vectors or equivalently the array pattern vectors. These vectors characterize the relative phase recorded by each antenna in the array as a function of the location and motion dynamics of the source as well as the arrangement of the antennas in the array. In the model presented above, each column of the matrix H signifies the steering vector to a particular source.

The equation (1) may now be written in the following matrix form:

$$y = H\theta + S\phi + n \quad (2)$$
$$= [HS]\begin{bmatrix}\theta\\\phi\end{bmatrix} + n$$

where
H: spread signal matrix of the source that the receiver is demodulating
$S=[s_2 \ldots s_p]$: spread signal matrix of all the other sources, i.e., the interference
$\phi=[\phi_2 \ldots \phi_p]$: interference amplitude vector Receivers that are currently in use correlate the measurement, y, with a replica of H to determine if H is present in the measurement. If H is detected, then the receiver knows the bit-stream transmitted by source number 1. Mathematically, this correlation operation is:

$$\text{correlation function} = (H^T H)^{-1} H^T y \quad (3)$$

where $^T$ is the transpose operation.

Substituting for y from equation (2) illustrates the source of the power control requirement:

$$(H^T H)^{-1} H^T y = (H^T H)^{-1} H^T (H\theta + S\phi + n) \quad (4)$$
$$= (H^T H)^{-1} H^T H\theta + (H^T H)^{-1} H^T S\phi + (H^T H)^{-1} H^T n$$
$$= \theta + (H^T H)^{-1} H^T S\phi + (H^T H)^{-1} H^T n$$

It is the middle term, $(H^T H)^{-1} H^T S\phi$, in the above equation that results in the near-far problem. If the codes are orthogonal, then this term reduces to zero, which implies that the receiver has to detect θ in the presence of noise (which is $(H^T H)^{-1} H^T n$) only. It is easy to see that as the amplitude of the other sources increases, then the term $(H^T H)^{-1} H^T S\phi$ contributes a significant amount to the correlation function, which makes the detection of θ more difficult.

The normalized correlation function, $(H^T H)^{-1} H^T$, defined above, is in fact the matched filter and is based on an orthogonal projection of y onto the space spanned by H. When H and S are not orthogonal to each other, there is leakage of the components of S into the orthogonal projection of y onto H. This leakage is geometrically illustrated in FIG. 1. Note in FIG. 1, that if S were orthogonal to H, then the leakage component goes to zero as is evident from equation 4, above. The present invention addresses an efficient method for mitigating this interference when H and S are not orthogonal.

Signal projection may be computed by means of performing the projection operation directly by computing $P_s = S(S^T S)^{-1} S^T$ and then computing the other desired quantities. This direct matrix inversion method requires computing the inverse, which may be prohibitive in hardware. In addition, the direct matrix inversion method cannot handle a subspace matrix S that is singular.

Signal projection may also be computed using Householder, Givens and Gram-Schmidt methods (QR methods). These methods may be used to decompose a given matrix into an orthonormal basis. In these QR methods, the subspace matrix is first decomposed into its orthonormal representation and then the orthonormal representation is used to compute the projection of the signal. No matrix inverse computations are required, but square root computations are needed in the computation of the orthonormal representation.

Thus, there is a need in the art for a method and apparatus that provide for signal projection computations in signal processing applications without the need for any matrix inversions or square root computations, as well as to provide for the handling of a subspace matrix S which is singular.

SUMMARY OF THE INVENTION

It is therefore an object of the present invention to provide a method and apparatus that provide for signal projection computations in signal processing applications without the need for any matrix inversions or square root computations.

It is a further object to provide a method and apparatus that provide for signal projections computations that can handle a subspace matrix S that is singular.

According to a first broad aspect of the present invention, there is provided a method for generating a projection from a received signal (y), the signal comprising H, a signal of the source of interest; S, the signals of all other sources and composed of vectors $s_1, s_2, s_3 \ldots, s_p$; and noise (n); the method comprising the steps of determining a basis matrix U for either H or S; storing elements of the basis matrix U; and determining $y_{perp}$ where: $y_{perp} = y - U(U^T U)^- U^T y$.

According to another broad aspect of the present invention, there is provided a method for generating a projection from a received signal (y), the signal comprising H, a spread signal matrix of the source of interest; S, the spread signal matrix of all other sources and composed of vectors $s_1, s_2, s_3 \ldots, s_p$; and noise (n); the method comprising the steps of: A. assigning $s_1$ as a first basis vector $u_1$; B. determining $\sigma_i$, where $u_i^T u_i = \sigma_i$; C. storing $u_i$; D. computing of inner products of the $s_{i+1}$ and the $u_1$ through $u_i$ vectors by utilizing a Multiply-add-accumulator (MAC) i times; E. multiplying the inner product with a respective scalar $1/\sigma_i$ and thereby creating a first intermediate product; F. scaling each respective basis vector $u_i$ by multiplying each respective first intermediate product with each respective basis vector $u_i$; G. obtaining a vector sum from step F; H. subtracting the vector sum from $s_{i-1}$ to obtain the next basis vector $u_{i+1}$; I. comparing $u_{i+1}$ to a predetermined value and if equal to or less than the value, discarding the $u_{i+1}$ and going to step N; J. storing $u_{i+1}$; K. determining an inner product of $u^T_{i+1} u_{i+1}$, L. determining the reciprocal of step K which is $1/\sigma_{i+1}$; M. storing $1/\sigma_{i+1}$; N. incrementing i; O. conducting steps D through N until all the s vectors have been processed which happens at i=p, where p is the total number of spread signal s vectors of interest; and determining $y_{perp}$ where: $y_{perp} = y - U(U^T U)^{-1} U^T y$.

According to another broad aspect of the present invention, there is provided a method for generating a projection from a received signal (y), the signal comprising H, a spread signal matrix of the source of interest; S, the spread signal matrix of all other sources and composed of vectors $s_1, s_2, s_3 \ldots, s_p$; and noise (n); the method comprising the steps of: A. assigning $s_1$ as a first basis vector $u_1$; B. determining $\sigma_i$, where $u_i^T u_i = \sigma_i$; C. storing $u_i$; D. computing of inner products of the $s_{i+1}$ and the $u_1$ through $u_i$ vectors by utilizing a Multiply-add-accumulator (MAC) i times; E. multiplying the inner product with a respective scalar $1/\sigma_i$ and thereby creating a first intermediate product; F. scaling each respective basis vector $u_i$ by multiplying each respective first intermediate product with each respective basis vector $u_i$; G. serially subtracting the intermediate product from $s_{i+1}$; H. utilizing the result from step G and subtracting the next incoming value of $$u_i \frac{1}{\sigma_i} u_i^T s_{i+1}$$

until all the values are processed; I. obtaining the next basis vector $u_{i+1}$ from step H; J. comparing $u_{i+1}$ to a predetermined value and if equal to or less than the value, discarding the $u_{i+1}$ and going to step O; K. storing $u_{i+1}$; L. determining an inner product of $u^T_{i+1} u_{i+1}$; M. determining the reciprocal of step K which is $1/\sigma_{i+1}$; N. storing $1/\sigma_{i+1}$; O. incrementing i; P. conducting steps D through O until all the s vectors have been processed which happens when i=p, where p is the total number of spread signal s vectors of interest; and Q. determining $y_{perp}$ where: $y_{perp} = y - U(U^T U)^{-1} U^T y$.

According to another broad aspect of the present invention, there is provided an apparatus for generating a projection from a received signal (y), the signal comprising H, a signal of the source of interest; S, the signals of all other sources and composed of vectors $s_1, s_2, s_3 \ldots, s_p$; and noise (n); the apparatus comprising: means for determining a basis vector U; means for storing elements of the basis vector U for H or S; and means determining $y_{perp}$ where: $y_{perp} = y - U(U^T U)^{-1} U^T y$.

According to another broad aspect of the present invention, there is provided an apparatus for generating a projection from a received signal (y), the signal comprising H, a spread signal matrix of the source of interest; S, the spread signal matrix of all other sources and composed of vectors $s_1, s_2, s_3 \ldots, s_p$; and noise (n); the apparatus comprising:

A. means for assigning $s_1$ as a first basis vector $u_1$;
B. means for determining $\sigma_i$, where $u_i^T u_i = \sigma_i$; and
C. means for storing $u_i$;
D. means for computing of inner products of the $s_{i+1}$ and the $u_1$ through $u_i$ vectors by utilizing a Multiply-add-accumulator (MAC) i times;
E. means for multiplying the inner product with a respective scalar $1/\sigma_i$ and thereby creating a first intermediate product;
F. means for scaling each respective basis vector $u_i$ by multiplying each respective first intermediate product with each respective basis vector $u_i$;
G. means for obtaining a vector sum from step F;
H. means for subtracting the vector sum from $s_{i+1}$ to obtain the next basis vector $u_{i+1}$;
I. means for comparing $u_{i+1}$ to a predetermined value and if equal to or less than the value, going to step N
J. means for storing $u_{i+1}$;
K. means for determining an inner product of $u^T_{i+1} u_{i+1}$;
L. means for determining the reciprocal of step K which is $1/\sigma_{i+1}$;
M. means for storing $1/\sigma_{i+1}$;
N. means for incrementing i;
O. means for conducting steps D through N until all the s vectors have been processed which happens at i=p and $u_p$ is computed, where p is the total number of spread signal s vectors of interest; and
P. means for determining $y_{perp}$ where: $y_{perp} = y - U(U^T U)^{-1} U^T y$.

According to another broad aspect of the present invention, there is provided an apparatus for generating a projection from a received signal (y), the signal comprising H, a spread signal matrix of the source of interest; S, the spread signal matrix of all other sources and composed of vectors $s_1, s_2, s_3 \ldots, s_p$; and noise (n); the apparatus comprising:

A. means for assigning $s_1$ as a first basis vector $u_1$;
B. means for determining $\sigma_i$, where $u_i^T u_i = \sigma_i$; and
C. means for storing $u_i$;
D. means for computing of inner products of the $s_{i+1}$ and the $u_1$ through $u_i$ vectors by utilizing a Multiply-add-accumulator (MAC) i times;
E. means for multiplying the inner product with a respective scalar $1/\sigma_i$ and thereby creating a first intermediate product;
F. means for scaling each respective basis vector $u_i$ by multiplying each respective first intermediate product with each respective basis vector $u_i$;
G. means for serially subtracting the intermediate product from $s_{i+1}$;
H. means for utilizing the result from step G and subtracting the next incoming value of $$u_i \frac{1}{\sigma_i} u_i^T s_{i+1}$$

until all the values are processed;
I. means for obtaining the next basis vector $u_{i+1}$ from step H;
J. means for comparing $u_{i-1}$ to a predetermined value and if equal to or less than the value, going to step O;
K. means for storing $u_{i+1}$;
L. means for determining an inner product of $u^T_{i+1} u_{i+1}$;
M. means for determining the reciprocal of step K which is $1/\sigma_{i+1}$;
N. means for storing $1/\sigma_{i+1}$;
O. means for incrementing i;
P. means for conducting steps D through O until all the s vectors have been processed which happens at i=p, where p is the total number of spread signal s vectors of interest; and
Q. means for determining $y_{perp}$ where: $y_{perp} = y - U(U^T U)^- u^T y$.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

Figure 1:
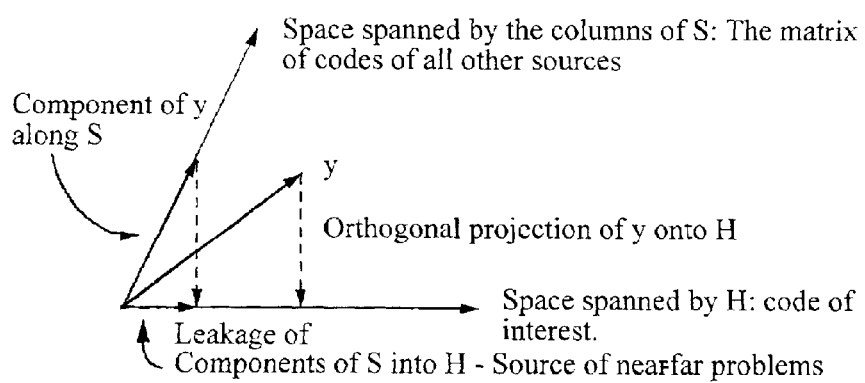
FIG. 1 is a diagram showing interference caused by cross-correlations in a CDMA system.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "analog" refers to any measurable quantity that is continuous in nature.

For the purposes of the present invention, the term "base station" refers to a transmitter and/or receiver that communicate(s) with multiple mobile or stationary units in a cellular environment.

For the purposes of the present invention, the term "baseline receiver" refers to a receiver against which a receiver of the present invention is compared.

For the purposes of the present invention, the terms "basis" and "basis vector" refer to a set of vectors that completely span the space under consideration. In 3-D space, any three linearly independent vectors comprise a basis for the 3-D space, and for 2-D space, any 2 vectors that are linearly independent comprise a "basis."

For the purposes of the present invention, the term "bit" refers to the conventional meaning of "bit," i.e. a fundamental unit of information having one of two possible values, a binary 1 or 0, or in bipolar binary terms, a −1 or a +1.

For the purposes of the present invention the term "Code-Division Multiple Access (CDMA)" refers to a method for multiple access in which all users share the same spectrum but are distinguishable from each other by a unique code.

For the purposes of the present invention, the term "chip" refers to a non-information bearing unit that is smaller than a bit, the fundamental information bearing unit. For example, one bit is composed of multiple chips in an application that employs spreading. Depending on the amount of the spreading factor, a fixed length sequence of chips constitute a bit.

For the purposes of the present invention, the term "code offset" refers to a location within a code. For example, base stations in certain cellular environments distinguish between each other by their location within a particular pseudorandom code.

For the purposes of the present invention, the term "correlation" refers to the inner product between two signals scaled by the length of the signals. Correlation provides a measure of how alike two signals are.

For the purposes of the present invention, the terms "decomposition" and "factorization" refer to any method used in simplifying a given matrix to an equivalent representation.

For the purposes of the present invention, the term "digital" refers to the conventional meaning of the term digital, i.e. relating to a measurable quantity that is discrete in nature.

For the purposes of the present invention, the term "doppler" refers to the conventional meaning of the term doppler, i.e. a shift in frequency that occurs due to movement in a receiver or transmitter and/or the background.

For the purposes of the present invention, the term "Global Positioning System (GPS)" refers to the conventional meaning of these terms, i.e. a satellite-based system for position location.

For the purposes of the present invention, the product $S^T S$ where S is a matrix, is called the "Grammian" of S.

For the purposes of the present invention, the term "in-phase" refers to the component of a signal that is aligned in phase with a particular signal, such as a reference signal.

For the purposes of the present invention, the term "quadrature" refers to the component of a signal that is 90 degrees out of phase with a particular signal, such as a reference signal.

For the purpose of the present invention, the term "interference" refers to the conventional meaning of the term interference, i.e. a signal that is not of interest, but which interferes with the ability to acquire, identify, detect, track or perform any other operation on the signal of interest. Interference is typically structured noise that is created by other processes that are trying to do the same thing.

For the purposes of the present invention, the term "linear combination" refers to the combining of multiple signals or mathematical quantities in an additive way, where each signal is multiplied by some non-zero scalar and all the resultant quantities so obtained summed together.

For the purposes of the present invention, a vector is "linearly dependent" with respect to a set of vectors if it can be expressed as an algebraic sum of any of the set of vectors.

For the purposes of the present invention, the term "matched filter" refers to a filter that is designed to facilitate the detection of a known signal by effectively correlating the received signal with an uncorrupted replica of the known signal.

For the purposes of the present invention, the term "noise" refers to the conventional meaning of noise with respect to the transmission and reception of signals, i.e. a random disturbance that interferes with the ability to detect a signal of interest, say, for example, the operation of a nearby electrical device. Additive "noise" adds linearly with the power of the signal of interest. Examples of noise can include automobile ignitions, power lines and microwave links.

For the purpose of the present invention, the term "matrix inverse" refers to the inverse of a square matrix S, denoted by $S^{-1}$, that is defined as that matrix which when multiplied by the original matrix equals the identity matrix, I, i.e. $SS^{-1}=S^{-1}S=I$, a matrix which is all zero save for a diagonal of all ones.

For the purposes of the present invention, the term "mobile" refers to a mobile phone that functions as a transmitter/receiver pair that communicates with a base station.

For the purposes of the present invention, the term "modulation" refers to imparting information on another signal, such as a sinusoidal signal or a pseudorandom coded signal, typically accomplished by manipulating signal parameters, such as phase, amplitude, frequency or some combination of these quantities.

For the purposes of the present invention, the term "multipath" refers to copies of a signal that travel a different path to the receiver.

For the purposes of the present invention, the term "norm" refers to a measure of the magnitude of a vector. The "2-norm" of a vector refers to its distance from the origin.

For the purposes of the present invention, the term "normalization" refers to a scaling relative to another quantity.

For the purposes of the present invention, two nonzero vectors, $e_1$ and $e_2$ are said to be "orthogonal" if their inner product (defined as $e_1^T e_2$, where T refers to the transpose operator) is identically zero. Geometrically, this refers to vectors that are perpendicular to each other.

For the purposes of the present invention, any two vectors are said to be "orthonormal" if, in addition to being orthogonal, each of their norms are unity. Geometrically, this refers to two vectors that, in addition to lying perpendicular to each other, are each of unit length.

For the purposes of the present invention, the term "processing gain" refers to the ratio of signal to noise ratio (SNR) of the processed signal to the SNR of the unprocessed signal.

For the purposes of the present invention, the term "projection" with respect to any two vectors x and y refers to the projection of the vector x onto y in the direction of y with a length equal to that of the component of x, which lies in the y direction.

For the purposes of the present invention, the term "pseudorandom number (PN)" refers to sequences that are typically used in spread spectrum applications to distinguish between users while spreading the signal in the frequency domain.

For the purposes of the present invention, the term "rake receiver" refers to a method for combining multipath signals in order to increase the processing gain.

For the purposes of the present invention the term "signal to noise ratio (SNR)" refers to the conventional meaning of signal to noise ratio, i.e. the ratio of the signal to noise (and interference).

For the purposes of the present invention, the term "singular matrix" refers to a matrix for which the inverse does not exist. In a "singular matrix," one of its rows or columns is not linearly independent of the rest, and the matrix has a zero determinant.

For the purposes of the present invention, the term "spread spectrum" refers to techniques that use spreading codes to increase the bandwidth of a signal to more effectively use bandwidth while being resistant to frequency selective fading.

For the purposes of the present invention, the term "spreading code" refers to a code used in communication systems to modify the bit being transmitted in a spread spectrum system, e.g. the CDMA Pseudorandom (PN) codes used in the short and long codes. Examples of spreading codes include Gold, Barker and Walsh codes.

For the purposes of the present invention, the term "steering vector" refers to a vector that contains the phase history of a signal that is used in order to focus the signal of interest.

For the purposes of the present invention, the term "symbol" refers to the fundamental information-bearing unit transmitted over a channel in a modulation scheme. A symbol may be composed of one or more bits, which can be recovered through demodulation.

For the purposes of the present invention, the term "transpose" refers to a mathematical operation in which a matrix is formed by interchanging rows and columns of another matrix. For example, the first row becomes the first column; the second row becomes the second column, and so on.

DETAILED DESCRIPTION

In the following detailed description, reference is made to the accompanying drawings that form a part hereof, and in which are shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the spirit and scope of the invention. The following detailed description is, therefore, not to be taken in a limiting sense.

The present invention provides a method and apparatus for computing the orthogonal basis for a matrix that is free of matrix inversions and square root computations. The present invention was developed in the context of signal processing applications and the removal of interference from coded signals. However, the application of the present invention is not limited to signal processing applications.

Linear combinations of structured signals are frequently encountered in a number of diverse signal environments including wireless communications, Global Positioning Systems (GPS) and radar. In each of these application areas, the receiver observes a linear combination of structured signals in noise. Mathematically, $$y = H\theta + n$$

where y is the received signal, the columns of the matrix H are the structured signal, $\theta$ is the relative weight of each component and n is the additive background noise.

In a wireless communication system, the columns of the matrix H represent the various coded signals and the elements of the vector θ are the powers of the coded signals. For example, in the base-station to mobile link of a CDMA-One system, the coded signals may be the various channels (pilot, paging, synchronization and traffic) and all their various multi-path copies from different base-stations at the appropriate code, phase and frequency offsets, and carrying on it navigation information.

In the mobile to base-station link, the columns of the matrix H may be the coded signals from the mobiles and their various multi-path copies.

In a GPS system, the columns of the matrix H may be the coded signals being broadcast by the GPS satellites at the appropriate code, phase and frequency offsets.

In an array application, the columns of the matrix may be the steering vectors or equivalently the array pattern vectors. These vectors characterize the relative phase recorded by each antenna in the array as a function of the location and motion dynamics of the source as well as the arrangement of the antennas in the array. In the model presented above, each column of the matrix H signifies the steering vector to a particular source.

The goal of the receiver in each case is to extract one or more of the structured signals, i.e., the columns of the matrix H, from the measured signal y. In some instances, the goal of the receiver is also to estimate the elements of the vector θ corresponding to the columns of interest. However, the remaining columns of the matrix of H, though not of interest to the receiver, will be a source of interference. This interference may be significant enough to impede the ability of the receiver to detect and extract the signal, i.e., column of H and relative weight, of interest. This problem is illustrated below using a CDMA example.

Let H be a vector containing the spread signal from source no.1 and let $\theta_1$ be the amplitude of the signal from this source. Let $s_i$ be the spread signals for the remaining sources and let $\phi_i$ be the corresponding amplitudes. Supposing that the receiver is interested in source number 1, the signals from the other sources may be considered to be interference. Then, the received signal is:

$$y = \theta_1 H + \phi_2 s_2 \ldots \phi_p s_p + n \quad (1)$$

where n is the additive noise term, and p is the number of sources in the CDMA system. Let the length of the vector y be m, where m is the number of points in the integration window. The number m is selected as part of the design process as part of the trade-off between processing gain and complexity. A window of m points of y is referred to herein as a segment.

The above equation is written below in the following matrix form:

$$y = H\theta + S\phi + n \quad (2)$$
$$= [HS]\begin{bmatrix} \theta \\ \phi \end{bmatrix} + n$$

where
H=spread signal matrix of the source that the receiver is demodulating,
S=[$s_2 \ldots s_p$]; spread signal matrix of all the other sources, i.e., the interference, and
φ=[$\phi_2 \ldots \phi_p$]; interference amplitude vector.

Receivers that are currently in use correlate the measurement, y, with a replica of H to determine if H is present in the measurement. If H is detected, then the receiver knows the bit-stream transmitted by source number 1. Mathematically, this correlation operation is:

$$\text{correlation function} = (H^T H)^{-1} H^T y \quad (3)$$

where $^T$ is the transpose operation.

Substituting for y from equation (2) illustrates the source of the power control requirement:

$$\begin{aligned}(H^T H)^{-1} H^T y &= (H^T H)^{-1} H^T (H\theta + S\phi + n) \\ &= (H^T H)^{-1} H^T H\theta + (H^T H)^{-1} H^T S\phi + (H^T H)^{-1} H^T n \\ &= \theta + (H^T H)^{-1} H^T S\phi + (H^T H)^{-1} H^T n \end{aligned} \quad (4)$$

It is the middle term, $(H^T H)^{-1} H^T S\phi$, in the above equation that results in the near-far problem. If the codes are orthogonal, then this term reduces to zero, which implies that the receiver has to detect θ in the presence of noise (which is $(H^T H)^{-1} H^T n$) only. It is easy to see that as the amplitude of the other sources increases, then the term $(H^T H)^{-1} H^T S\phi$ contributes a significant amount to the correlation function, which makes the detection of θ more difficult.

The normalized correlation function, $(H^T H)^{-1} H^T$, defined above, is in fact the matched filter and is based on an orthogonal projection of y onto the space spanned by H. When H and S are not orthogonal to each other, there is leakage of the components of S into the orthogonal projection of y onto H. This leakage is geometrically illustrated in FIG. 1. Note in FIG. 1 that if S were orthogonal to H, then the leakage component goes to zero as is evident from equation (4).

One way to mitigate this interference is to remove the interference from y by means of a projection operation. Mathematically, a projection onto the space spanned by the columns of the matrix S is given by:

$$P_s = S(S^T S)^{-1} S^T$$

A projection onto the space perpendicular to the space spanned by the columns of S is obtained by subtracting the above projection $P_s$ from the identity matrix (a matrix with ones on the diagonal and zeros everywhere else). Mathematically, this projection is represented by:

$$P_s^\perp = I - P_s = I - S(S^T S)^{-1} S^T$$

The projection matrix $P_s^\perp$ has the property that when it is applied to a signal of the type Sφ, i.e., this is a signal that lies in the space spanned by the columns of S, it completely removes Sφ no matter what the value of φ, i.e., it is magnitude independent. This cancellation is illustrated below:

$$P_s^\perp (S\phi) = (I - S(S^T S)^{-1} S^T) S\phi = S\phi - S(S^T S)^{-1} S^T S\phi = S\phi - S\phi = 0$$

When applied to our measurement vector y, it cancels the interference terms:

$$P_s^\perp y = P_s^\perp (H\theta + S\phi + n) = P_s^\perp H\theta + P_s^\perp S\phi + P_s^\perp n = P_s^\perp H\theta + P_s^\perp n$$

The hardware realization of this projection operation and interference cancellation presents certain complexities and hurdles, overcoming which are the main objectives of this invention.

In general, using $P_s^\perp$ to compute $y_{perp}$ requires the computation of the Grammian of S (where S is an m×p matrix), which requires $mp^2$ mathematical floating point operations (flops) and computing its inverse, which requires additional $p^3$ flops.

Clearly, the computation of the inverse of the Grammian is difficult, time-consuming and expensive, and progressively more so as p increases. It is also potentially unstable when there are singularities in S. Singularities in S would occur if any of its columns were to be linearly dependent on a set of vectors comprising any of its other columns, and thus an entire row and column of the Grammian becomes identically zero. This would result in an inability to compute the inverse of the Grammian, and consequently, hamper any computations downstream from that step.

Even in the absence of any singularities, performing matrix inverses in hardware implementation, especially in the fixed-point implementations that are likely to be used in practical implementations, can present complications. For a detailed discussion on this issue, see Rick A. Cameron, 'Fixed-Point Implementation of a Multistage Receiver', PhD Dissertation, January 1997, Virginia Polytechnic Institute and State University, the entire contents and disclosure of which is hereby incorporated by reference in its entirety.

One alternative to computing the inverse of the Grammian directly is to decompose S using QR factorization methods into Q and R matrices, and then utilizing those in further computations. QR factorization may be performed using any one of the Householder, Givens, Fast Givens, Gram-Schmidt, or the modified Gram-Schmidt methods. These methods are discussed in detail in Golub G. H and C. F. Van Loan, Matrix Computations, Baltimore, Md., Johns Hopkins Univ. Press, 1983, the entire contents and disclosure of which is hereby incorporated by reference.

The set of Householder methods involve computations of the order of $4\,mp^2$ and provide more information than is needed for the projection operation and come with the added cost of increased computations. Givens methods may have potentially high overflows. The Gram-Schmidt and the modified Gram-Schmidt methods are computationally more efficient, but involve square root computations. Square roots are particularly difficult and expensive to implement at the chip level, because of the multiple clock cycles needed to compute a single square root.

The present invention describes an apparatus for computing $P_s^{-1}y$ to compute the subspace projection of a signal via the computation of the inverse of the Grammian of the subspace that is free of both square roots and inverse computations, and hence is eminently suitable for real-time application on digital signal processors, FPGAs, ASICs and other realizations.

For the purposes of the remaining description, the following nomenclature applies:

S=m×p matrix containing the spread signal interference structure, composed of vectors $s_1, s_2, s_3 \ldots, s_p$;

y=m×1 measurement vector;

$y_{perp}$=m×1 vector whose components that lie in the space spanned by the columns of the matrix S have been projected out; and U=m×p orthogonal (but not orthonormal) basis for S composed of vectors $u_1, u_2, u_3, \ldots, u_p$.

In accordance with an embodiment of the present invention, let $u_1=s_1$. Then, $s_2$ may be resolved into a component that is parallel to $s_1$ and another component that is not. Then, $u_2$ may be defined to be a component of $s_2$ that is not in $s_1$.

Then, $s_2$ is given by the equation:

$$s_2 = s_1 a_1 + u_2,$$

where $a_1$ is the component of $s_2$ that lies in $s_1$, and $s_2$ is expressed as a linear combination of $s_1$ and $u_2$, where $u_2$ is the new desired basis vector.

Solving for $a_1$, the following is obtained:

$$a_1 = (s_1^T s_1)^{-1} s_1^T s_2$$

or alternately, since $u_1 = s_1$, $$a_1 = (u_1^T u_1)^{-1} u_1^T s_2.$$

Therefore, $u_2 = s_2 - s_1 a_1$ $$= s_2 - u_1 (u_1^T u_1)^{-1} u_1^T s_2.$$

Figure 2:
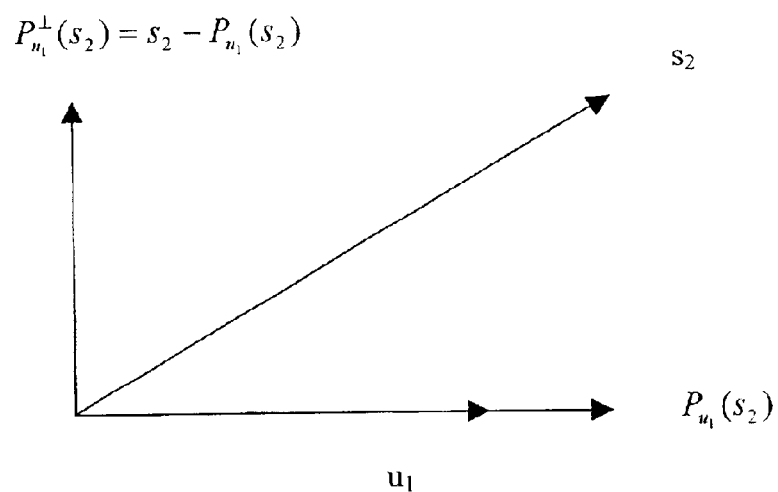
FIG. 2 is a diagram showing a second basis vector $u_2$ being computed as the residual of the projection of $s_2$ onto $u_1$.

Thus, the second basis vector, $u_2$ is the component of $s_2$ that is not in $u_1$, illustrated geometrically in FIG. 2. Moreover, the basis vectors $u_1$ and $u_2$ together span the same space that is spanned by $s_1$ and $s_2$. Furthermore, $u_1$ and $u_2$ are orthogonal to each other;

$$\begin{aligned}
u_1 \cdot u_2 &= u_1 \cdot (s_2 - u_1(u_1^T u_1)^{-1} u_1^T s_2) \\
&= u_1^T s_2 - u_1^T u_1 (u_1^T u_1)^{-1} u_1^T s_2 \\
&= u_1^T s_2 - I u_1^T s_2 \\
&= u_1^T s_2 - u_1^T s_2 = 0
\end{aligned}$$

Now, let the two basis vectors be represented by: $U_2 = [u_1 u_2]$, and proceed to find the next basis vector, $u_3$.

Figure 3:
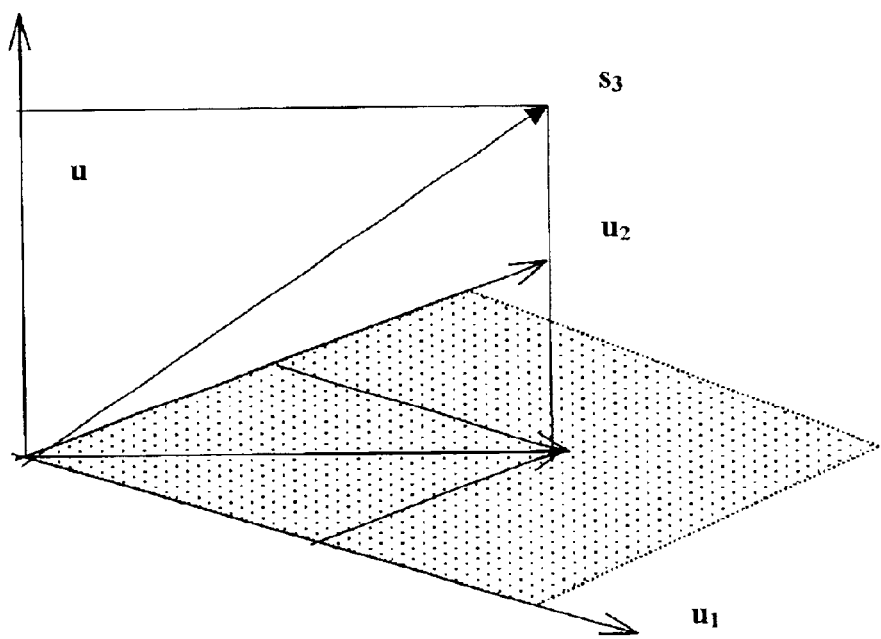
FIG. 3 is a diagram showing a third basis vector being computed after projecting $s_3$ onto the space spanned by $u_1$ and $u_2$, and then calculating the residual.

Next, decompose the vector $s_3$ into a component that lies in the space spanned by the already computed basis vectors, $U_2$ and a residual component that lies outside the space spanned by $U_2$, which then becomes the next basis vector. This step is geometrically illustrated in FIG. 3.

Setting $s_3 = U_2 a_2 + u_3$, and solving for $a_2$ and $u_3$, the following is obtained:

$$u_3 = s_3 - u_1(u_1^T u_1)^{-1} u_1^T s_3 - u_2(u_2^T u_2)^{-1} u_2^T s_3.$$

Mathematically, the third basis vector $u_3$ is the third vector in the S matrix $s_3$ with those components that lie in the space spanned by the previous basis vectors, $u_1$ and $u_2$, projected out.

Figure 4:
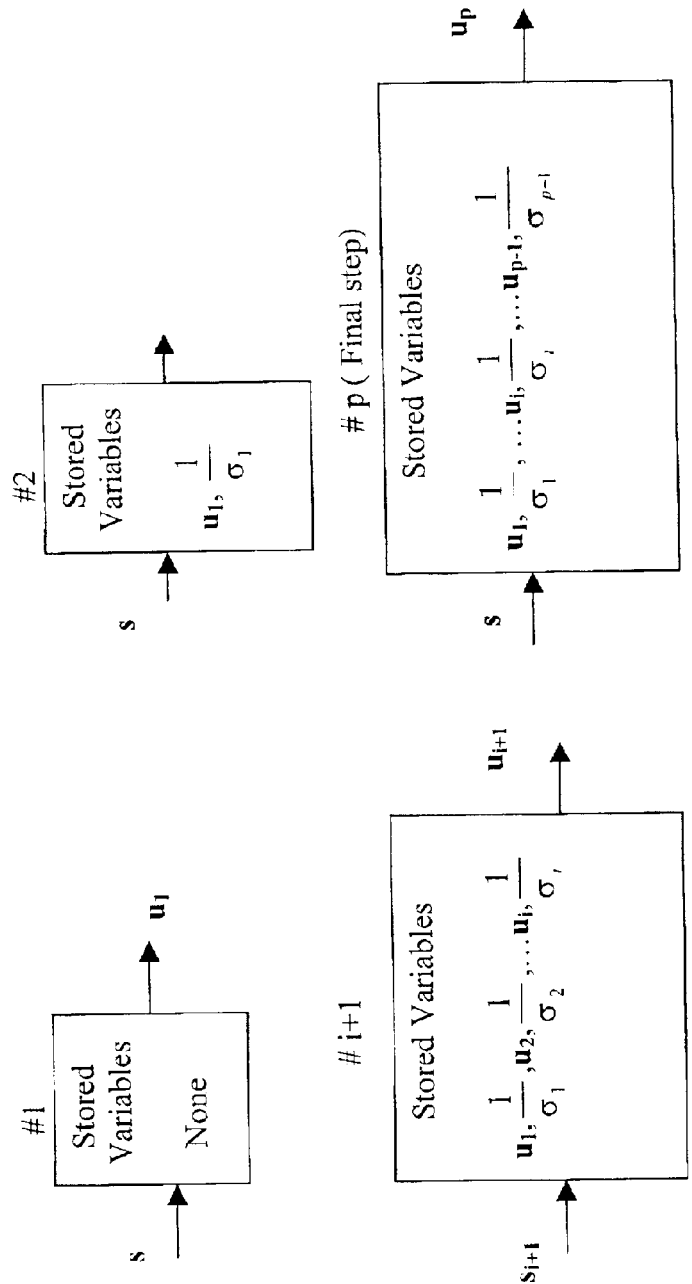
FIG. 4 is a diagram showing the inputs, stored variables, and fresh outputs for different iterations (#) within each step (#1 and #2 refer to the first and second steps, #I+1 denotes the general $I+1^{th}$ step, and #p is the terminating step.
Figure 5:
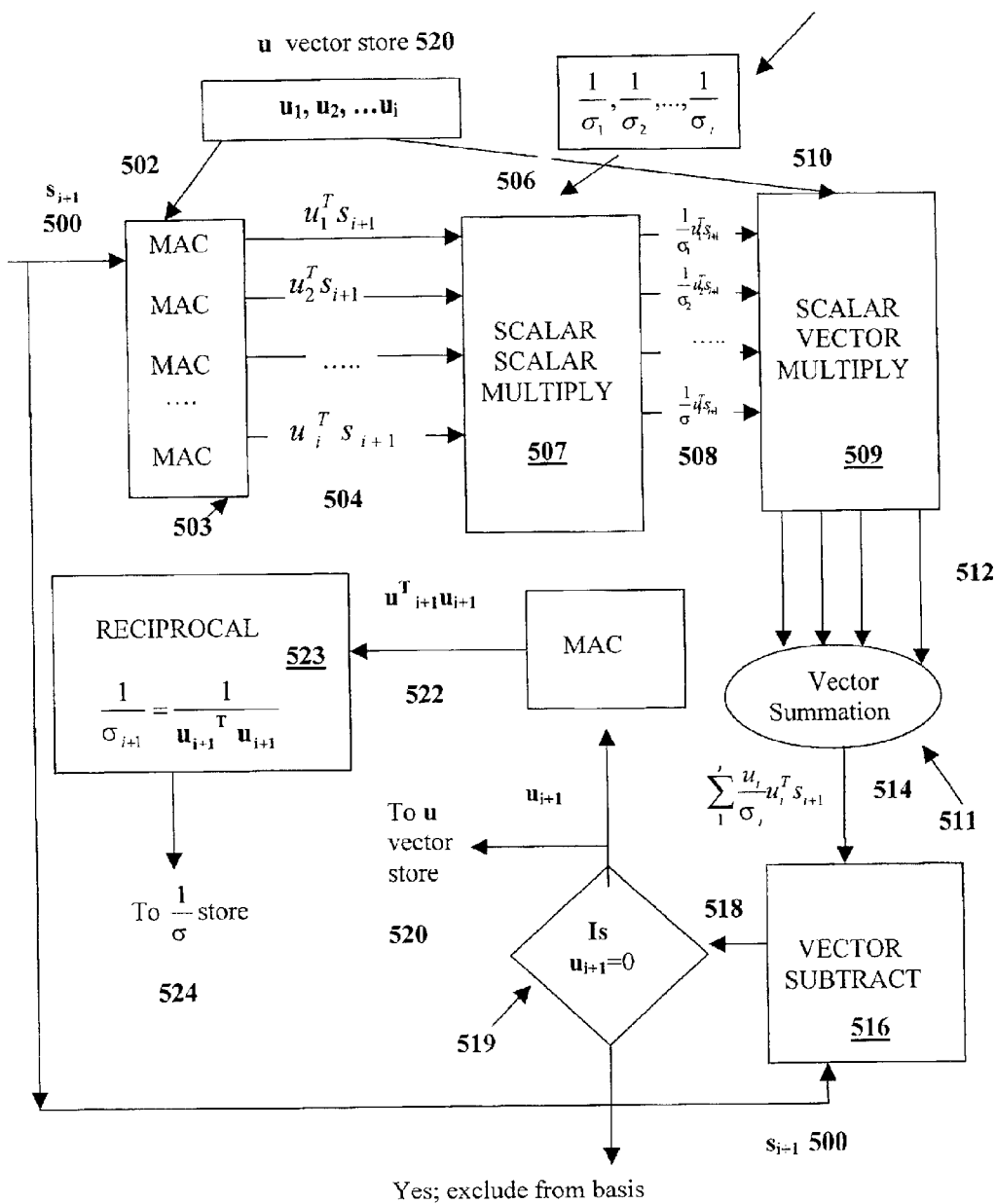
FIG. 5 is a flowchart showing a sample iteration step in an apparatus according to the present invention.

In terms of inputs, stored variables, and outputs, the implementation as the procedure unfolds can be visualized in FIG. 4. A more detailed architecture showing the interactions between the different hardware elements are shown in FIG. 5. These Figures are discussed in detail, below.

The process of orthogonalization continues in the same manner, and at each step, the next basis vector is computed from the corresponding s vector by projecting out from the vector all its components that lie in the space spanned by the previously computed basis vectors. In case the incoming vector is linearly dependent on the previously computed basis vectors, the result of subtracting out its projection onto the previously computed basis from itself becomes approximately zero or at any other predetermined threshold level, i.e., to the order of machine precision, and this vector does not contribute significantly to the basis, and should therefore be excluded. This point is a tradeoff between accuracy and computational complexity. This discussion will assume that the desire is to have a system that is as accurate as possible. Proceeding along these lines, the $i^{th}$ step becomes the calculation of the $i^{th}$ basis vector $u_i$ and can be expressed as $$u_i = s_i - u_1(u_1^T u_1)^{-1} u_1^T s_i - u_2(u_2^T u_2)^{-1} u_2^T s_i - \ldots - u_{i-1}(u_{i-1}^T u_{i-1})^{-1} u_{i-1}^T s_i$$

The process of computing the basis vector terminates at i=p with the calculation of the $p^{th}$ basis vector $u_p$. Exploiting the fact that $u_i^T u_i$ is a scalar and its inverse therefore is a simple reciprocal; the $i^{th}$ step of the iteration process for computing the basis vectors can be rewritten as $$u_i = s_i - u_1 \frac{1}{\sigma_1} u_1^T s_1 - u_2 \frac{1}{\sigma_2} u_2^T s_i - \ldots - u_{i-1} \frac{1}{\sigma_{i-1}} u_{i-1}^T s_i,$$

where $\sigma_{i-1} = u_{i-1}^T u_{i-1}$ and is the square of the 2-norm of the $u_i$ vector.

The $i+1^{th}$ step would be $$u_{i+1} = s_{i+1} - u_1 \frac{1}{\sigma_1} u_1^T s_{i+1} - u_2 \frac{1}{\sigma_2} u_2^T s_{i+1} - \ldots - u_{i-1} \frac{1}{\sigma_{i-1}} u_{i-1}^T s_{i+1} - u_i \frac{1}{\sigma_i} u_i^T s_{i+1}$$

If the last two equations are examined closely, it is found that the $\sigma_i$ terms may be reused, and thereby their computation avoided at every step. The $i+1^{th}$ step essentially would consist then of multiplying pre-computed values of the reciprocal terms $$\left( \frac{1}{\sigma_i} \right)$$

with the newly computed $u_i u_i^T s_{i-1}$ values (which can be computed most efficiently by first performing the $u_i^T s_{i+1}$ operation and scaling the number obtained using $$\frac{1}{\sigma_i}$$

to obtain another scalar number, and then finally scaling the vector $u_i$ using this scalar), and then subtracting out the sum of these products from the $s_{i+1}$ vector.

If the result of the subtraction is zero (to the order of the chip precision), that vector is excluded from the basis and not used in further computations. It should be appreciated that any other level of precision may be utilized without departing from the teachings of the present invention.

In a computationally constrained system, where memory is available freely, the $i-1^{th}$ step could be sped up by storing and reusing the values of the $u_i u_j^T$ outer product.

At this point, the matrix factorization for S has been completed and the following has been computed $U = [u_1 u_2 u_3 \ldots u_{p-1} u_p]$. The vectors comprising U are all orthogonal to each other; $u_i^T u_j = 0$ for all $i \neq j$, and $u_i^T u_i = \sigma_i$ for all i, where $\sigma_i$ is a scalar inner product. Note that this property varies slightly from typical orthogonal factorizations, which are also orthonormal computations in that the 2-norm of all the basis vectors are unity, i.e. $u_i^T u_i = 1$ for all i.

Recalling that the objective of the factorization was to arrive at a method to compute $y_{perp}$ without the need to compute square-roots and matrix inverses, factorization is used to substitute for S in the original equation:

$$y_{perp} = y - S(S^T S)^{-1} S^T y;$$

and the following is obtained:

$$y_{perp} = y - U(U^T U)^{-1} U^T y.$$

The orthogonal factorization is useful due to the simplicity of computing the inverse of the Grammian.

$$(U^T U)^{-1} = \begin{bmatrix} u_1^T u_1 & u_1^T u_2 & \cdots & u_1^T u_p \\ u_2^T u_1 & u_2^T u_2 & \cdots & u_2^T u_p \\ \vdots & \vdots & \cdots & \vdots \\ u_p^T u_1 & u_p^T u_2 & \cdots & u_p^T u_p \end{bmatrix}^{-1}$$

becomes a diagonal matrix $$(U^T U)^{-1} = \begin{bmatrix} u_1^T u_1 & 0 & \cdots & 0 \\ 0 & u_2^T u_2 & \cdots & 0 \\ \vdots & \vdots & \cdots & \vdots \\ 0 & 0 & \cdots & u_p^T u_p \end{bmatrix}^{-1} = \begin{bmatrix} \sigma_1 & 0 & \cdots & 0 \\ 0 & \sigma_2 & \cdots & 0 \\ \vdots & \vdots & \cdots & \vdots \\ 0 & 0 & \cdots & \sigma_p \end{bmatrix}^{-1}$$

because $u_i^T u_j = 0$ for all $i \neq j$.

The inverse is another diagonal matrix with the diagonal elements replaced by their reciprocals, as shown below:

$$(U^T U)^{-1} = \begin{bmatrix} \frac{1}{\sigma_1} & 0 & \cdots & 0 \\ 0 & \frac{1}{\sigma_2} & \cdots & 0 \\ \vdots & \vdots & \cdots & \vdots \\ 0 & 0 & \cdots & \frac{1}{\sigma_p} \end{bmatrix}$$

Thus, the computation $$y_{perp} = y - U(U^T U)^{-1} U^T y$$

reduces to $$y_{perp} = y - U \begin{bmatrix} \frac{1}{\sigma_1} & 0 & \cdots & 0 \\ 0 & \frac{1}{\sigma_2} & \cdots & 0 \\ \vdots & \vdots & \cdots & \vdots \\ 0 & 0 & \cdots & \frac{1}{\sigma_p} \end{bmatrix} U^T y$$

$$= y - [u_1 u_2 \ldots u_{n-1} u_p] \begin{bmatrix} \frac{1}{\sigma_1} & 0 & \cdots & 0 \\ 0 & \frac{1}{\sigma_2} & \cdots & 0 \\ \vdots & \vdots & \cdots & \vdots \\ 0 & 0 & \cdots & \frac{1}{\sigma_p} \end{bmatrix} [u_1 u_2 \ldots u_{n-1} u_p]^T y$$

which is equivalent to the representation $$y_{perp} = y - u_1 \frac{1}{\sigma_1} u_1^T y - u_2 \frac{1}{\sigma_2} u_2^T y - \ldots u_{p-1} \frac{1}{\sigma_{p-1}} u_{p-1}^T y - u_p \frac{1}{\sigma_p} u_p^T y.$$

Thus, the process of computing the interference free signal vector has been simplified to a computation that is numerically stable in the presence of singularities in S, and one that is free of both matrix inverses and square root computations.

The projection of the signal vector onto the space spanned by the columns of S, $y_s$, is given by the representation $$y_s = u_1 \frac{1}{\sigma_1} u_1^T y - u_2 \frac{1}{\sigma_2} u_2^T y - \ldots u_{p-1} \frac{1}{\sigma_{p-1}} u_{p-1}^T y - u_p \frac{1}{\sigma_p} u_p^T y$$

According to a preferred embodiment of the present invention, the implementation of the algorithm involves the building of an apparatus that takes in as inputs the matrix S (whose columns are the vectors, s) and the measurement signal vector y, and produces as output the $y_{perp}$ vector, after performing the operation of projecting out the portion of the signal that is represented by S.

In this implementation, the input may be visualized as a stream of s vectors being input into the apparatus one at a time (of length m) followed at the end by the y vector (also of length m), with the $y_{perp}$ vector being the desired output at the end of the computational process. Each step in real-time would begin with the input of the first s vector, and terminate with the output of the $y_{perp}$ vector.

An apparatus according to an embodiment of the present invention may be built using the basic operations detailed below.

Each step involves p iterations (one for each column in the S matrix), beginning with the input of the first column, $s_1$, and ending with $s_p$. It should be appreciated that the mathematical complexity of the system may be reduced by choosing p to be a number smaller than the number of columns in the S matrix. This sacrifices accuracy for simplicity but is still considered within the teachings of the present invention. The following discussion will assume that we are not making any accuracy compromises. The flow of variables and the interconnection between the different basic elements of the apparatus are shown in FIG. 5, which describes the i+1$^{th}$ iteration being the input of the $s_{i+1}$ vector and the computation of the $u_{i+1}$ basis vector.

Figure 6:
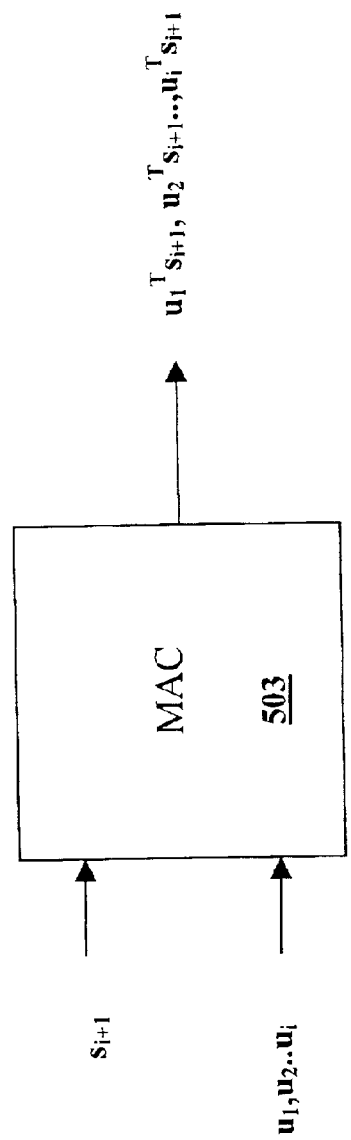
FIG. 6 is a diagram showing the computation of the inner product of the new s vector with each of the existing basis vectors.

The first step is the computation of the inner product of the $s_{i+1}$ vector 500 and each of the previously computed and stored basis vectors, $u_1$ through $u_i$ 502. This step is shown in FIG. 6, and may be realized using a single Multiply-add-accumulator (MAC) 503 i times in succession, or by using a bank of i MACs in parallel, depending on the tradeoff between the hardware costs and requirements of speed. For a detailed discussion on MACs please see U.S. Pat. No. 6,230,180, to Mohamed et. al., the entire contents of which are incorporated by reference herein.

The i inner-products obtained 504 are each next multiplied by a scalar multiplier 507 (shown in FIG. 7) by their respective previously computed and stored $$\frac{1}{\sigma} s$$

506 to produce the $$\frac{1}{\sigma_j} u_j^T s_{i+1}$$

values 508 which are then used to scale the basis vectors from storage 510 (shown in FIG. 8) to produce i $$u_j \frac{1}{\sigma_j} u_j^T s_{i+1}$$

vectors 512, which represent the components of the $s_{i+1}$ vector that lie in the space spanned by each of the previously computed basis vectors. Scalar vector multiplier 509 performs the scaling. The stored $$\frac{1}{\sigma}$$

are preferably stored in memory 521.

Figure 7:
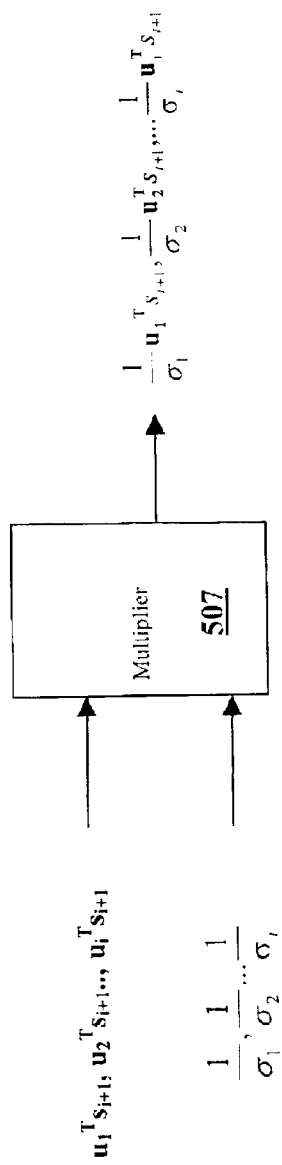
FIG. 7 is a diagram that shows scaling the $U^T$s inner products with the pre-computed $1/\sigma$ values.
Figure 8:
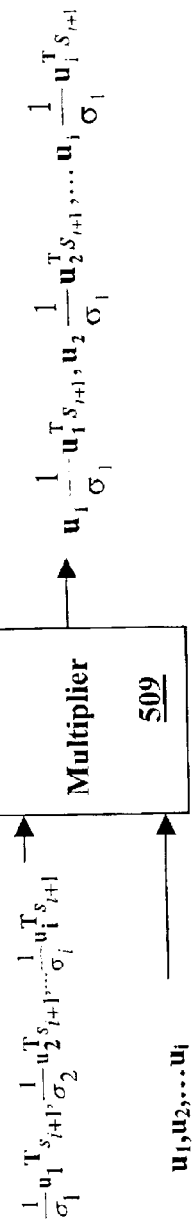
FIG. 8 is a diagram that shows scaling of each of the computed basis vectors.

The steps shown in FIG. 7 and FIG. 8 may be realized either in serial or in parallel (with varying degrees of parallelism) depending on the speed versus hardware cost tradeoff.

Figure 9:
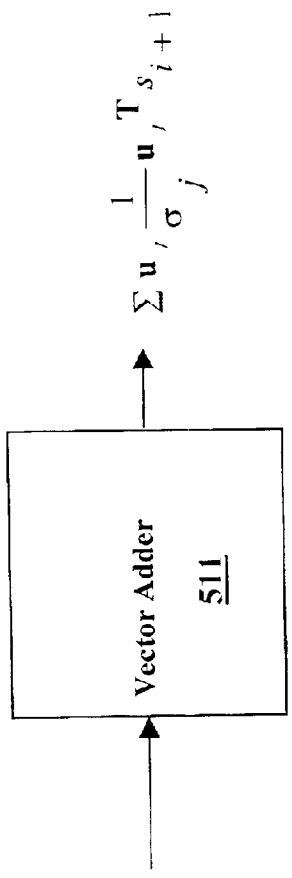
FIG. 9 is a diagram that shows computing the vector sum, $$\sum u_j \frac{1}{\sigma_j} u^T s_{j+1};$$
Figure 10:
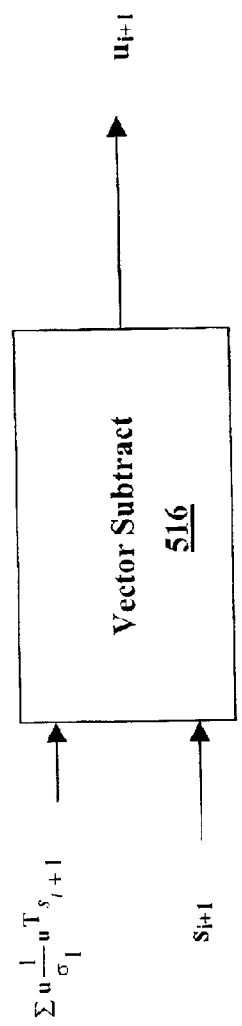
FIG. 10 is a diagram showing that the new basis vector is obtained by subtracting from the original s vector the sum of its projections onto the space spanned by the previously computed basis vectors.
Figure 11:
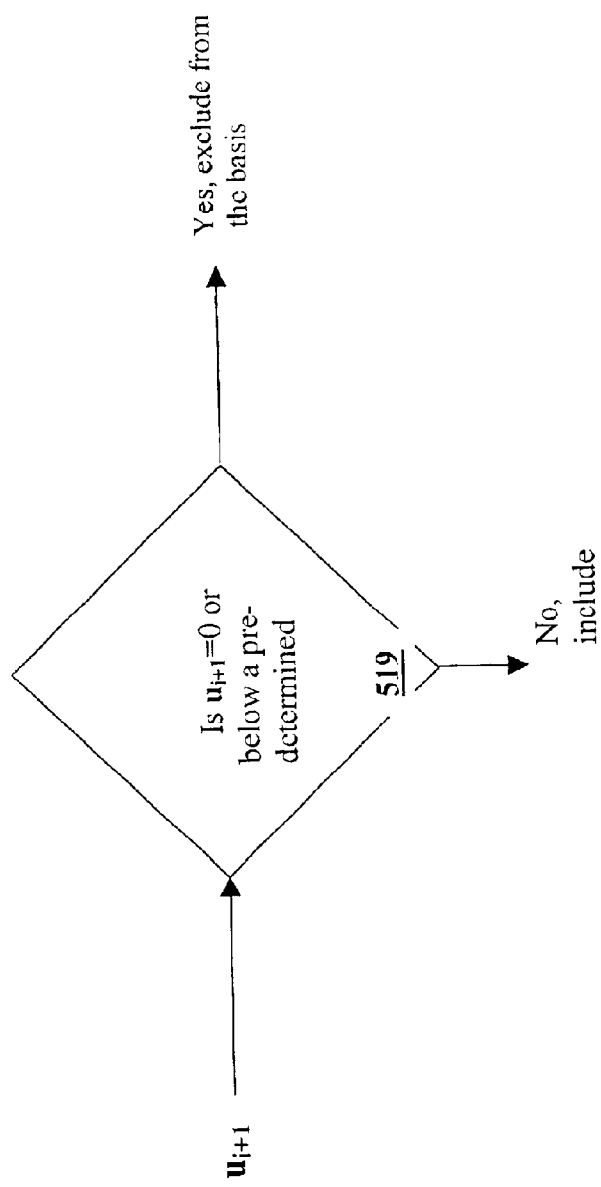
FIG. 11 is a diagram verifying that the newly computed basis vector is non-zero in order to determine whether to include it in the basis and for further computations.

The vector sum of these components 514 is then obtained by vector adder 511 (shown in FIG. 9) which is then subtracted from the $s_{i+1}$ vector 500 by subtractor 516 (shown in FIG. 10) to obtain the new basis vector $u_{i+1}$ 518. In the event that the $s_{i-1}$ vector is a linear combination of the previously computed basis vectors, the corresponding $u_{i+1}$ would be zero, the verification of which is the next step 519 (shown in FIG. 11).

Figure 12:
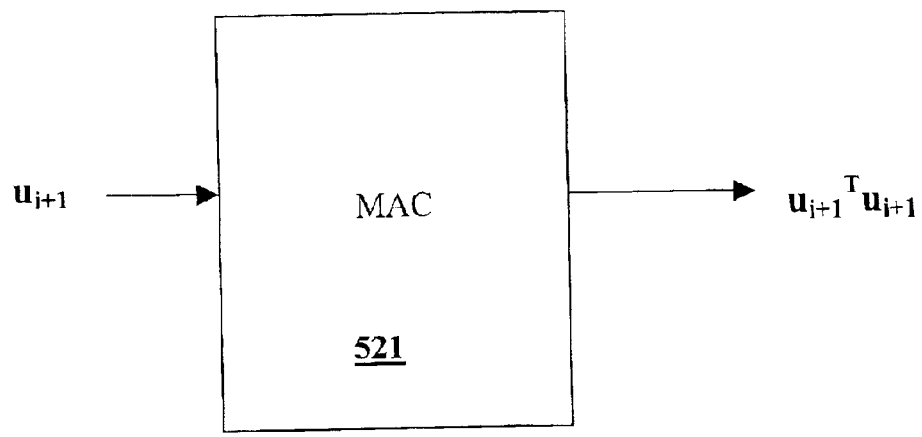
FIG. 12 is a diagram computing the $u_{i+1}{}^T u_{1+1}$ inner product.
Figure 13:
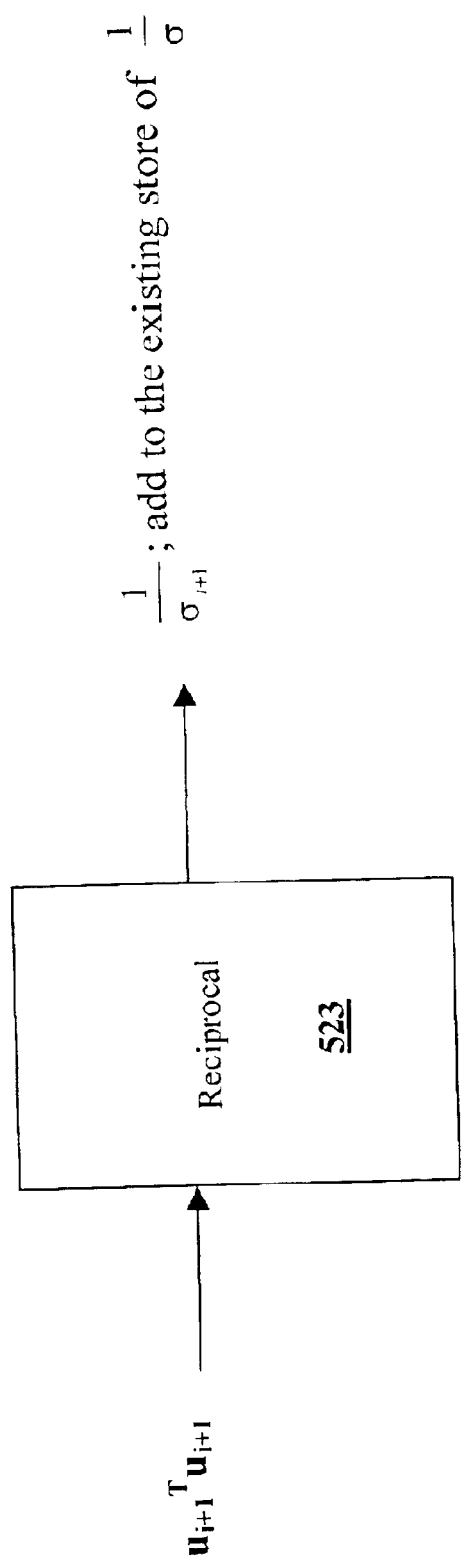
FIG. 13 is a diagram showing the computation and storage of the reciprocal of the $u_{i+1}{}^T u_{1+1}$ inner product for future computations.

If $u_{i+1}$ is zero, then that vector is excluded from the basis and not used in further computations. Even if $u_{i+1}$ was not zero, but below a pre-determined threshold, it is excluded from the basis because cancellation is the subspace spanned by that particular interference vector will not produce sufficient gain in performance to warrant its use in the basis, and subsequently, for cancellation. Otherwise, the $u_{i+1}$ is stored for use in future computations 520. In addition, the inner-product of the new basis vector $u_{i+1}$ with itself, $u^T_{i+1} u_{i+1}$ 522 is computed using a MAC 521 (shown in FIG. 12), and then its reciprocal is computed 524 (shown in FIG. 13) and stored for use in the next iteration steps by element 523.

FIG. 4 illustrates the inputs, stored variables, and the outputs for the different iteration steps, discussed above.

All the above iteration steps are repeated p times until the input of the last $s_p$ vector, and its basis vector $u_p$ computed, at which point the computation of the orthogonal basis for S is complete.

Figure 14:
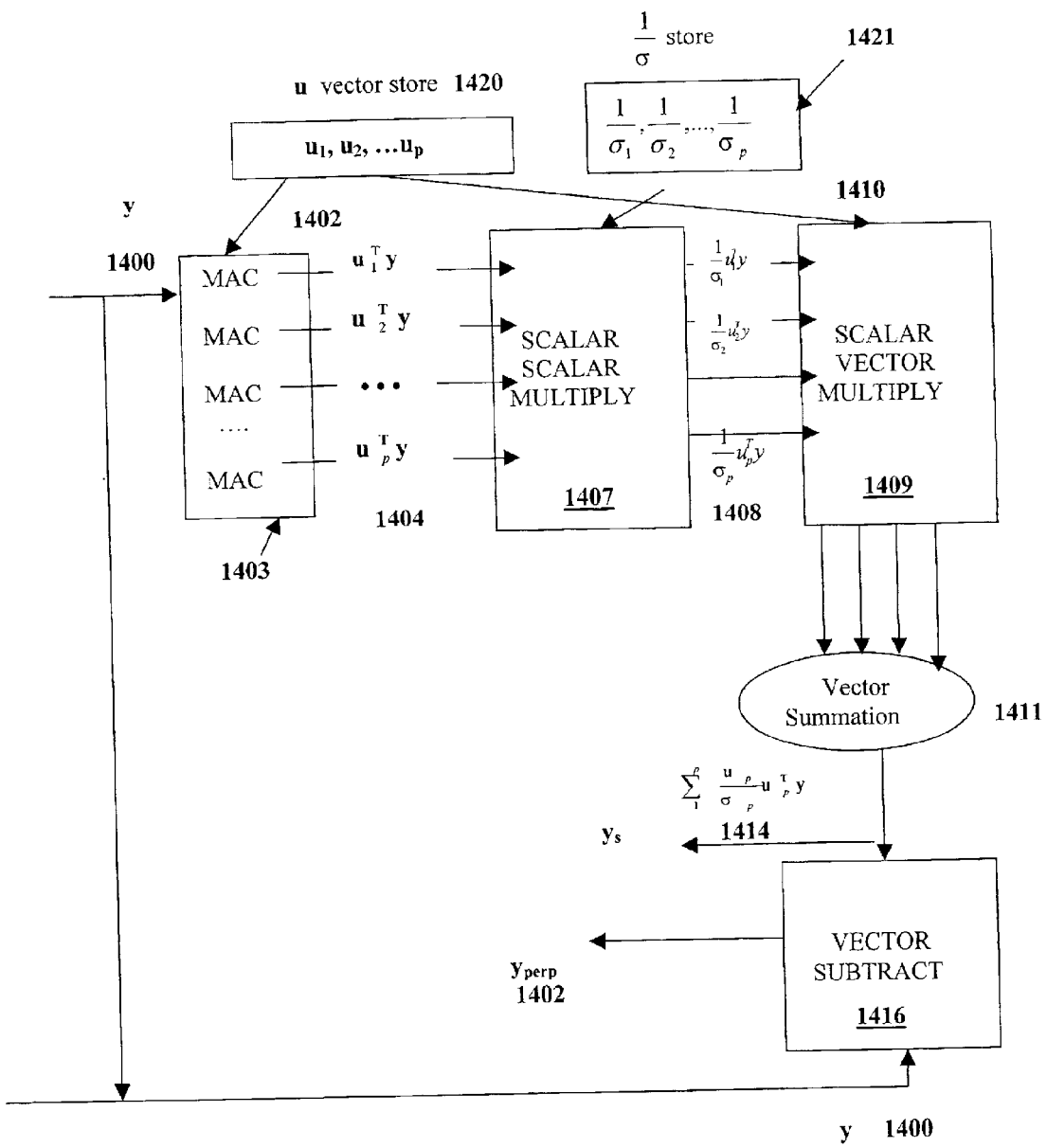
FIG. 14 is a flowchart showing an apparatus according to an embodiment of the present invention used to compute $y_{perp}$.

FIG. 14 illustrates the novel manner by which an apparatus according to the present invention may be used to compute $y_s$ which is the output at 1414 and $y_{perp}$ 1402, the components of a given signal y 1400 in the direction along and perpendicular to the space spanned by S, respectively. For this, the apparatus should first have computed the complete orthogonal basis for S as illustrated in FIG. 5. As may be seen, many elements from FIG. 5 may be utilized in this embodiment and respective reference numerals have been utilized.

Figure 15:
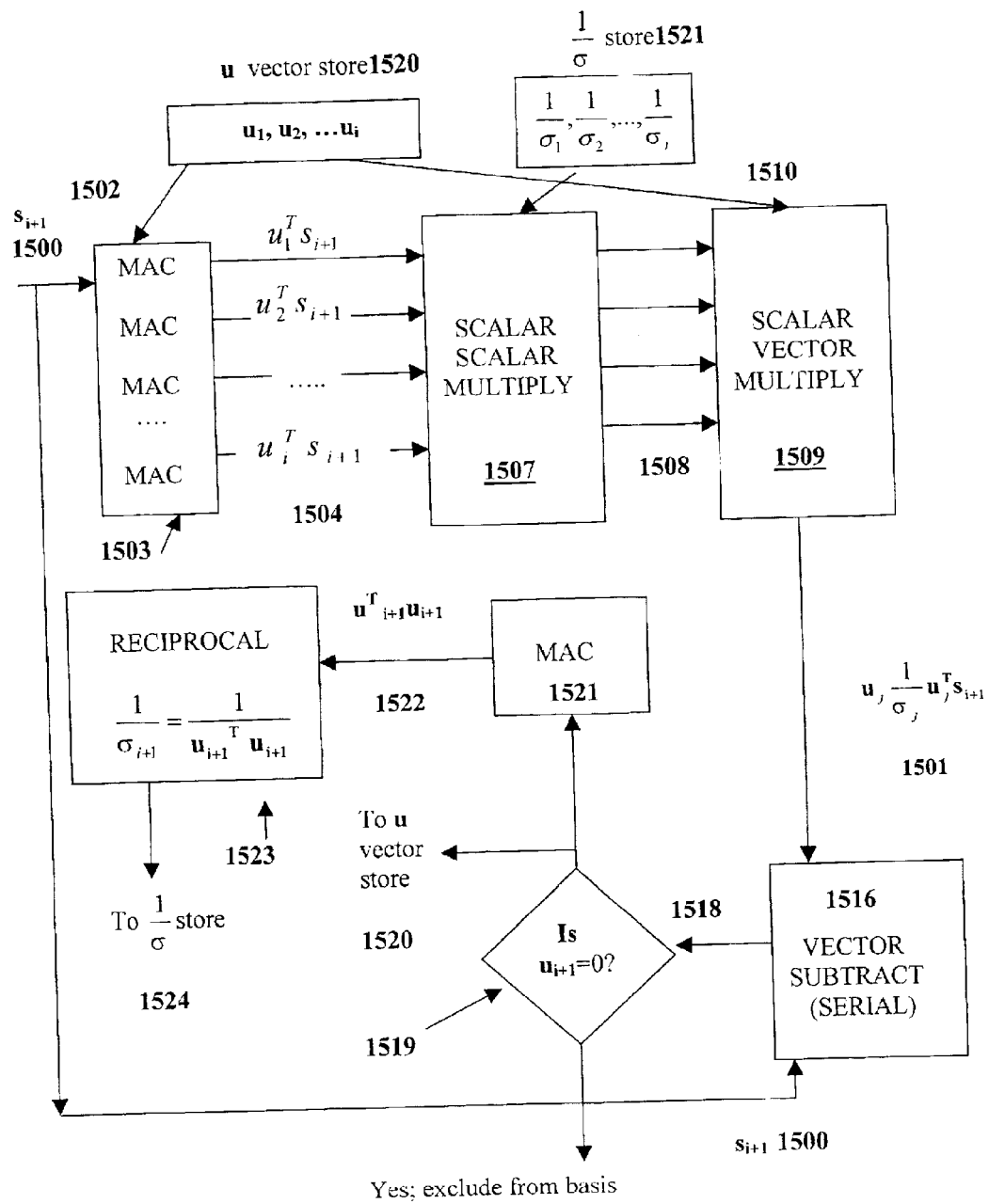
FIG. 15 is a flowchart showing an apparatus according to an embodiment of the present invention.

According to an alternative embodiment of the present invention, illustrated in FIG. 15, the summation and the subtraction steps are replaced by a single serial subtractor, and the incoming value of $$u_i \frac{1}{\sigma_i} u_i^T s_{i+1}$$

1501 is serially subtracted out from the $s_{i+1}$ vector 1500, temporarily storing the result obtained, and then proceeding to subtract out the next incoming value of $$u_i \frac{1}{\sigma_i} u_i^T s_{i+1}$$

until all the values are processed, until the next basis vector $u_{i+1}$ 1520 is computed. As may be seen, many elements from FIG. 5 may be utilized in this embodiment and respective reference numerals have been utilized.

Figure 16:
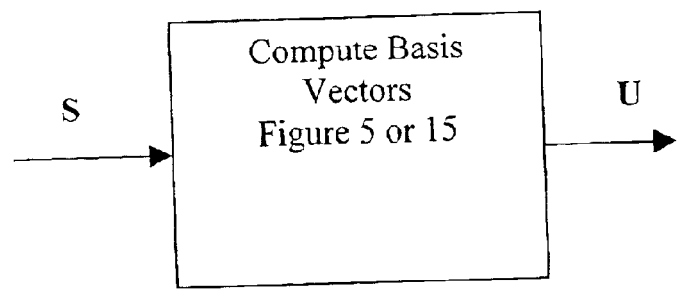
FIG. 16 is a diagram showing an apparatus according to an embodiment of the present invention used to compute the orthogonal basis of a matrix.

An apparatus of the present invention may be used in a variety of ways to achieve different signal processing objectives. Such an apparatus may be used to calculate the orthogonal (but not orthonormal) decomposition of a matrix S in the mode shown in FIG. 16. In this mode of operation, the embodiment shown in FIG. 5 may be used until all the basis vectors in 520 are computed, the set of which comprises the orthogonal basis for S. An apparatus of the present invention thus may be used to compute the orthogonal decomposition of a matrix S, even when it is derived for applications not specifically associated with a CDMA environment. Thus, the teachings of the present invention are not limited to processing signals in just the CDMA environment but to any digital signal.

Figure 17:
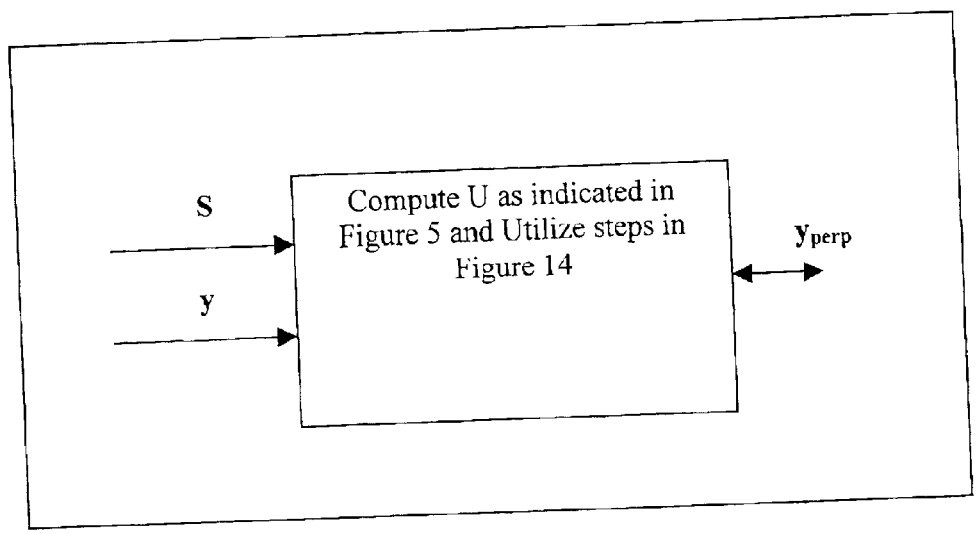
FIG. 17 is a diagram showing an apparatus according to an embodiment of the present invention used to compute $y_{perp}$.

For implementing projections and canceling interference in a signal y where the interference lies in the subspace spanned by S, an apparatus of the present invention may be used in the mode shown in FIG. 17. Here, an apparatus of the present invention may take as inputs the signal vector y, and the subspace matrix S, and produce as output the component that lies outside, $y_{perp}$. In this mode of operation; first, the embodiment shown in FIG. 5 may be used to compute the basis vectors in 520, and upon completing the computation of the basis vector, the embodiment shown in FIG. 14 may be used, and the output at 1402 is $y_{perp}$.

Figure 18:
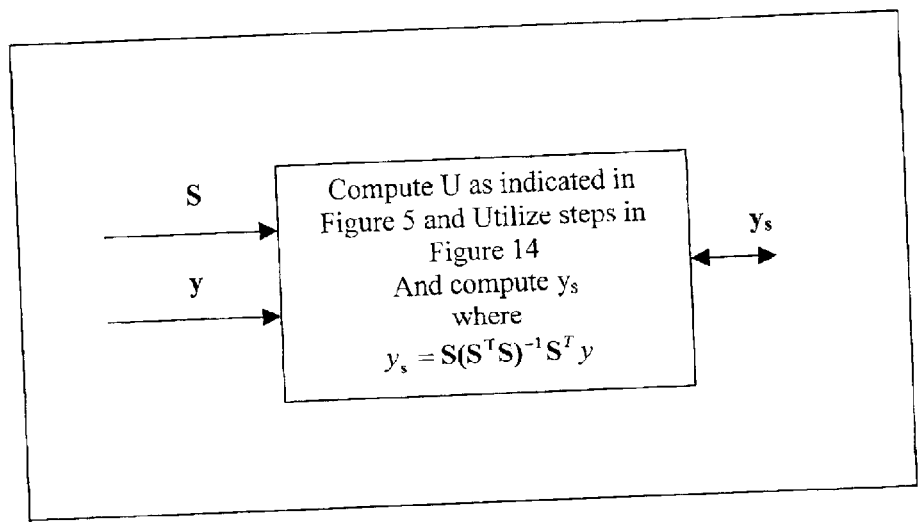
FIG. 18 is a diagram showing an apparatus according to an embodiment of the present invention used to compute $y_s$.

In FIG. 18, an apparatus of the present invention may be used to compute the component of y that lies in the subspace spanned by a matrix S, $y_s$. In this mode of operation, the embodiment shown in FIG. 5 may be used followed by the use of the embodiment shown in FIG. 14, and $y_s$ is the output at 1414.

In addition, the same apparatus could be used to compute the projection of a reference signal vector onto the space spanned by a matrix formed from a set of interference vectors, and the projection of a reference signal vector perpendicular to the space spanned by a matrix formed from a set of interference vectors. This would be useful in implementations in signal processing applications, where, rather than calculating the orthogonal projection of a signal in the space of the interference and then correlating it using the desired reference signal, the orthogonal projection of the desired reference signal in the space of the interference vectors is computed using this present invention, and then correlated with the original measurement signal. This teaching is also considered within the scope of the present invention.

Figure 19:
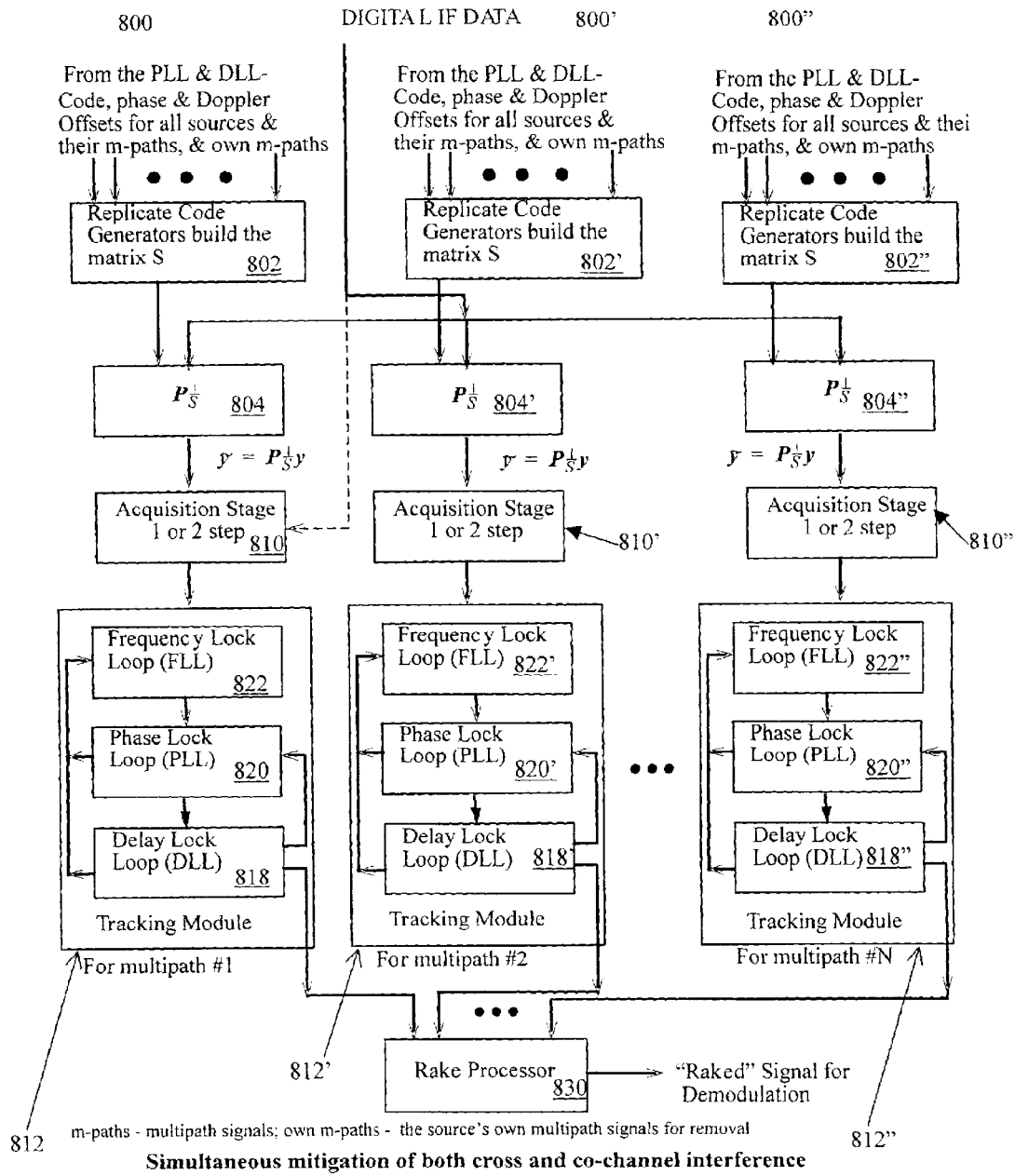
FIG. 19 is a flowchart showing an application of an embodiment of the present invention in a CDMA wireless application.

As an illustration of the use of this invention, FIG. 19 shows an implementation of the Coded Signal Processing Engine (CSPE) that is designed for acquiring, tracking and demodulating pseudorandom (PN) coded signals in the presence of interference from other PN coded signals. One example of a PN coded signal is the Code Division Multiple Access (CDMA) signals that are used in communications systems.

The operation of the structure is illustrated in FIG. 19. In FIG. 19 the architectural layout is presented of a single data processing channel for eliminating both cross-channel and co-channel interference. A single data processing channel is designed to acquire and track the signal from a single source.

In the architecture presented, the single data processing channel consists of multiple fingers 800, 800' and 800" where each finger consists of a code generation module 802, 802' and 802" (for building the S matrix); $P_S^\perp$ modules 804, 804' and 804"; an acquisition module 810, 801, and 810" and a tracking module 812, 812' and 812". The tracking module, of course, consists of FLLs 822, 822' and 822"; PLLs 820, 820' and 820"; as well as DLLs 818, 818' and 818". Each processing finger 800, 800' and 800" within a channel has the function of acquiring and tracking a distinct multipath signal from the same source.

In order to understand how the architecture depicted in FIG. 19 works, the starting assumption may be used that this channel has just been assigned to track the signals from a particular source and that the system is already in the process of acquiring and tracking other sources or sources.

The input data to this channel arrives in the form of a digital IF data stream. Since there are other sources being tracked, the replicate code generator module 802, 802' and 802" would generate the appropriate S matrix and this matrix is used to create $P_S^\perp$ 804, 804' and 804". In this case, the digital IF data stream y is provided as input into the $P_S^\perp$ module. The output of this module 804 is fed into the acquisition module 810 in the same finger.

In case the system was not tracking any other sources, then there would be no S matrix generated and therefore no $P_S^\perp$ function. In this case, the input digital IF data stream is passed directly into the acquisition stage.

The acquisition stage acquires the signal and all its multipath copies from the source of interest. If the acquisition stage identifies more than one multipath, then multiple tracking sections are used for each multipath signal individually. The outputs of the tracking stages 812, 812' and/or 812" are the code, phase, and Doppler offsets that are used to build the S in the other channels. Furthermore, if all the available processing tracks are consumed, there is no need to mitigate any co-channel interference.

Now suppose that due to co-channel interference, the acquisition stage 810, 810' or 810" was only able to acquire fewer multipaths than there are available processing fingers, i.e., the other multipath signals are buried in the co-channel interference. In that case, the information from the acquisition stage is used to track the first signals identified. The information about the code, phase and Doppler offsets of the first signals being tracked are obtained from the tracking system 812, 812' and/or 812" and are provided as input into the replicate code generators modules 802' and 802" in the same channel.

The S matrix built in this finger now has included in it the code of the lone signal being processed in the finger 800. As a result, the finger 800' will eliminate interference from all the other sources as well as the dominant signal from the source of interest. The acquisition module 810' in this finger then acquires the multipath signal which is now visible because the interference from the dominant signal has been eliminated. That multipath is then tracked in 812' and the tracking information is provided to both the finger 800 (to improve its ability to track the dominant signal) as well as to the other fingers, e.g., 800" to aid in finding additional weak multipath signals. The tracking information from all these modules are used to perform the Rake operation 830 for data demodulation.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method for generating a projection of a received signal y, said received signal comprising H, a signal of a source of interest; S, the signals of all other sources and multi-path versions of the source of interest and composed of vectors $s_1, s_2, s_3, \ldots, s_p$; and noise (n); the method comprising the steps of:

determining a basis matrix U composed of basis vectors $u_1, u_2, \ldots u_p$;

storing elements of said basis matrix U;

generating a diagonal matrix from stored said elements of the basis matrix U;

generating one or more scalars from the diagonal matrix and from the basis vectors of the basis matrix U; and applying the one or more scalars to the received signal to project the signal of the source of interest.

2. The method recited in claim 1, further comprising the step of computing the basis vectors, wherein computing the basis vectors comprises the steps of:

A. assigning $s_1$ as a first vector of basis matrix U;

B. decomposing $s_2$ into a component which is in said basis matrix U and a component that is not ($u_2$); and C. redefining the basis matrix U to incorporate basis vector $u_2$.

3. The method recited in claim 2, wherein said step of computing the basis vectors further comprises the steps of:

repeating steps B and C for each vector of S.

4. The method recited in claim 2, wherein said step of computing the basis vectors further comprises the steps of:

comparing $u_i$ to a predetermined threshold and if $u_i$ is greater than said threshold, adding $u_i$ to the basis and repeating steps B and C for each vector of S, else ignoring the $u_i$ and continuing to repeat steps B and C.

5. The method recited in claim 2, wherein said step of computing the basis vectors further comprises the steps of:

computing $1/\sigma_i$, where $u_i^T u_i = \sigma_i$; and storing $u_i$ and $1/\sigma_i$.

6. The method recited in claim 2, wherein said step of computing the basis vectors further comprises the steps of:

computing $$u_i = s_i - u_1 \frac{1}{\sigma_1} u_1^T s_i - u_2 \frac{1}{\sigma_2} u_2^T s_i - \ldots - u_{i-1} \frac{1}{\sigma_{i-1}} u_{i-1}^T s_i;$$

storing $u_i$ and $1/\sigma_i$, wherein $u_i^T u_i = \sigma_i$; and repeating said computing and storing steps if $u_i$ is above a predetermine threshold, else ignoring this particular $u_i$.

7. The method recited in claim 1, wherein said step of applying comprises the step of calculating $y_{perp}$ with the following formula:

$$y_{perp} = y - U \begin{bmatrix} \frac{1}{\sigma_1} & 0 & \ldots & 0 \\ 0 & \frac{1}{\sigma_2} & \ldots & 0 \\ \vdots & \vdots & \ldots & \vdots \\ 0 & 0 & \ldots & \frac{1}{\sigma_p} \end{bmatrix} U^T y,$$

wherein $y_{perp}$ is a projected said received signal y, $\sigma_i = u_i^T u_i$, and $u_i$ is a basis vector of U.

8. The method recited in claim 7, wherein said step of calculating $y_{perp}$ comprises the step of calculating $y_{perp}$ with the following formula:

$$y_{perp} = y - u_1 \frac{1}{\sigma_1} u_1^T y - u_2 \frac{1}{\sigma_2} u_2^T y - \ldots u_{p-1} \frac{1}{\sigma_{p-1}} u_{p-1}^T y - u_p \frac{1}{\sigma_p} u_p^T y$$

9. The method recited in claim 8, further comprising the step of determining $$y_s = u_1 \frac{1}{\sigma_1} u_1^T y - u_2 \frac{1}{\sigma_2} u_2^T y - \ldots u_{p-1} \frac{1}{\sigma_{p-1}} u_{p-1}^T y - u_p \frac{1}{\sigma_p} u_p^T y,$$

wherein $y_s$ is a projected said signal of the source of interest.

10. A method for generating a projection of a received signal y, said received signal comprising H, a spread signal matrix of a source of interest; S, the spread signal matrix of all other sources of interest and composed of vectors $s_1, s_2, s_3 \ldots, s_p$; and noise n; the method comprising the steps of:

forming an orthogonal basis U of the matrix S, comprising:

A. assigning $s_i$ as a first basis vector $u_1$,

B. determining $\sigma_i$, where $u_i^T u_i = \sigma_i$,

C. storing $u_i$,

D. computing of inner products of the $s_{i+1}$ and the $u_1$ through $u_i$ vectors, E. multiplying said inner product with a respective scalar $1/\sigma_i$ and thereby creating a first intermediate product, F. scaling each respective basis vector $u_i$ by multiplying each respective first intermediate product with each respective basis vector $u_i$, G. obtaining a vector sum from step F, H. subtracting said vector sum from $s_{i+1}$ to obtain the next basis vector $u_{i+1}$, I. comparing $u_{i+1}$ to a predetermined value and if equal to or less than said value, discarding the $u_{i+1}$ and going to step N, J. storing $u_{i+1}$, K. determining an inner product of $u^T_{i+1} u_{i+1}$, L. determining the reciprocal of step K which is $1/\sigma_{i+1}$, M. storing $1/\sigma_{i+1}$, N. incrementing i, and O. conducting steps D through N until i=p, where p is the total number of said sources of interest;

generating a diagonal matrix from stored $1/\sigma_{i+1}$ values;

generating one or more scalars from the diagonal matrix and from the basis vectors of the orthogonal basis U; and applying the one or more scalars to the received signal to project the source of interest.

11. The method recited in claim 10, wherein said computing step (D) is conducted in series.

12. The method recited in claim 10, wherein said computing step (D) is conducted in parallel.

13. The method recited in claim 10, wherein said multiplying step (E) is conducted in series.

14. The method recited in claim 10, wherein said multiplying step (E) is conducted in parallel.

15. The method recited in claim 10, wherein said scaling step (F) is conducted in series.

16. The method recited in claim 10, wherein said scaling step (F) is conducted in parallel.

17. The method recited in claim 10, wherein said storing step (C) also stores $\sigma_i$.

18. The method recited in claim 10, wherein said storing step (C) also stores $1/\sigma_i$.

19. The method recited in claim 10, wherein said inner product step (K) is conducted in series.

20. The method recited in claim 10, wherein said inner product step (K) is conducted in parallel.

21. The method recited in claim 10, further comprising the step of determining $$y_s = u_1 \frac{1}{\sigma_1} u_1^T y - u_2 \frac{1}{\sigma_2} u_2^T y - \ldots u_{p-1} \frac{1}{\sigma_{p-1}} u_{p-1}^T y - u_p \frac{1}{\sigma_p} u_p^T y,$$

wherein $y_s$ is a projected said source of interest.

22. A method for generating a projection of a received signal y, said received signal comprising H, a spread signal matrix of a source of interest; S, the spread signal matrix of all other sources of interest and composed of vectors $s_1$, $s_2$, $s_3$ ..., $s_p$; and noise (n); the method comprising the steps of:
   forming an orthogonal basis U of the matrix S, comprising:
   A. assigning $s_1$ as a first basis vector $u_1$,
   B. determining $\sigma_i$, where $u_i^T u_i = \sigma_i$,
   C. storing $u_i$,
   D. computing of inner products of the $s_{i+1}$ and the $u_1$ through $u_i$ vectors,
   E. multiplying said inner product with a respective scalar $1/\sigma_i$ and thereby creating a first intermediate product,
   F. scaling each respective basis vector $u_i$ by multiplying each respective first intermediate product with each respective basis vector $u_i$,
   G. serially subtracting said intermediate product from $s_{i+1}$,
   H. utilizing the result from step G and subtracting the next incoming value of $$u_i \frac{1}{\sigma_i} u_i^T s_{i+1}$$

until all the values are processed,
   I. obtaining the next basis vector $u_{i+1}$ from step H,
   J. comparing $u_{i+1}$ to a predetermined value and if equal to or less than said value, discarding $u_{i+1}$ and going to step O,
   K. storing $u_{i+1}$,
   L. determining an inner product of $u^T_{i+1} u_{i+1}$,
   M. determining the reciprocal of step K which is $1/\sigma_{i+1}$,
   N. storing $1/\sigma_{i+1}$,
   O. incrementing i, and
   P. conducting steps D through O until i=p, where p is the total umber of said sources of interest;
   generating a diagonal matrix from stored $1/\sigma_{i+1}$ values;
   generating one or more scalars from the diagonal matrix and from the basis vectors of the orthogonal basis U; and
   applying the one or more scalars to the received signal to project the source of interest.

23. The method recited in claim 22, wherein said computing step (D) is conducted in series.

24. The method recited in claim 22, wherein said computing step (D) is conducted in parallel.

25. The method recited in claim 22, wherein said multiplying step (E) is conducted in series.

26. The method recited in claim 22, wherein said multiplying step (E) is conducted in parallel.

27. The method recited in claim 22, wherein said scaling step (F) is conducted in series.

28. The method recited in claim 22, wherein said scaling step (F) is conducted in parallel.

29. The method recited in claim 22, wherein said storing step (C) also stores $\sigma_i$.

30. The method recited in claim 22, wherein said storing step (C) also stores $1/\sigma_i$.

31. The method recited in claim 22, wherein said inner product step (L) is conducted in series.

32. The method recited in claim 22, wherein said inner product step (L) is conducted in parallel.

33. The method recited in claim 22, further comprising the step of determining $$y_s = u_1 \frac{1}{\sigma_1} u_1^T y - u_2 \frac{1}{\sigma_2} u_2^T y - \ldots u_{p-1} \frac{1}{\sigma_{p-1}} u_{p-1}^T y - u_p \frac{1}{\sigma_p} u_p^T y,$$

wherein $y_s$ is a projected said source of interest.

34. An apparatus for generating a projection of received signal y, said received signal comprising H, a signal of a source of interest; S, the signals of all other sources and composed of vectors $s_1$, $s_2$, $s_3$ ..., $s_p$; and noise (n); the apparatus comprising:
   means for determining a basis vector U;
   means for storing elements of said basis vector U; and
   means for generating a diagonal matrix from stored said elements of the basis vector U;
   means for generating one or more scalars from the diagonal matrix and from the basis vector U; and
   means for applying the one or more scalars to the received signal to project the signal of the source of interest.

35. An apparatus for generating a projection of a received signal y, said received signal comprising H, a spread signal matrix of a source of interest; S, the spread signal matrix of all other sources of interest and composed of vectors $s_1$, $s_2$, $s_3$ ..., $s_p$; and noise (n); the apparatus comprising:
   means for forming an orthogonal basis U of the matrix S, comprising:
   A. means for assigning $s_1$ as a first basis vector $u_i$,
   B. means for determining $\sigma_i$, where $u_i^T u_i = \sigma_i$,
   C. means for storing $u_i$,
   D. means for computing of inner products of the $s_{i+1}$ and the $u_1$ through $u_i$ vectors,
   E. means for multiplying said inner product with a respective scalar $1/\sigma_i$ and thereby creating a first intermediate product,
   F. means for scaling each respective basis vector $u_i$ by multiplying each respective first intermediate product with each respective basis vector $u_i$,
   G. means for obtaining a vector sum from step F,
   H. means for subtracting said vector sum from $s_{i+1}$ to obtain the next basis vector $u_{i+1}$,
   I. means for comparing $u_{i+1}$ to a predetermined value and if equal to or less than said value, discarding this $u_{i+1}$ and going to step N,
   J. means for storing $u_{i+1}$,
   K. means for determining an inner product of $u^T_{i+1} u_{i+1}$,
   L. means for determining the reciprocal of step K which is $1/\sigma_{i+1}$,
   M. means for storing $1/\sigma_{i+1}$,
   N. means for incrementing i,
   O. means for conducting steps D through N until i=p, where p is the total number of said sources of interest;
   means for generating a diagonal matrix from stored $1/\sigma_{i+1}$ values;
   means for generating one or more scalars from the diagonal matrix and from the basis vectors of the orthogonal basis U; and means for applying the one or more scalars to the received signal to project the source of interest.

36. An apparatus for generating a projection from a received signal y, said received signal comprising H, a spread signal matrix of a source of interest; S, the spread signal matrix of all other sources of interest and composed of vectors $s_1, s_2, s_3 \ldots, s_p$; and noise (n); the apparatus comprising:

means for forming an orthogonal basis U of the matrix S, comprising:
A. means for assigning $s_1$ as a first basis vector $u_i$,
B. means for determining $\sigma_i$, where $u_i^T u_i = \sigma_i$,
C. means for storing $u_i$,
D. means for computing of inner products of the $s_{i+1}$ and the $u_1$ through $u_i$ vectors,
E. means for multiplying said inner product with a respective scalar $1/\sigma_i$ and thereby creating a first intermediate product,
F. means for scaling each respective basis vector $u_i$ by multiplying each respective first intermediate product with each respective basis vector $u_i$,
G. means for serially subtracting said intermediate product from $s_{i+1}$,
H. means for utilizing the result from step G and subtracting the next incoming value of $$u_i \frac{1}{\sigma_i} u_i^T s_{i+1}$$

until all the values are processed,
I. means for obtaining the next basis vector $u_{i+1}$ from step H,
J. means for comparing $u_{i+1}$ to a predetermined value and if equal to or less than said value, going to step O,
K. means for storing $u_{i+1}$,
L. means for determining an inner product of $u^T_{i+1} u_{i+1}$,
M. means for determining the reciprocal of step K which is $1/\sigma_{i+1}$,
N. means for storing $1/\sigma_{i+1}$,
O. means for incrementing i,
P. means for conducting steps D through O until i=p, where p is the total number of said sources of interest;

means for generating a diagonal matrix from stored $1/\sigma_{i+1}$ values;

means for generating one or more scalars from the diagonal matrix and from the basis vectors of the orthogonal basis U; and means for applying the one or more scalars to the received signal to project the source of interest.

37. A method for generating a projection of a received signal y, said received signal comprising H, a signal of a source of interest; S, the signals of all other sources and multi-path versions of the source of interest and composed of vectors $s_1, s_2, s_3 \ldots, s_p$; and noise (n); the method comprising the steps of:

determining a basis matrix U composed of basis vectors $u_1, u_2 \ldots, u_p$;

storing elements of said basis matrix U;

generating a diagonal matrix from stored said elements of the basis matrix U;

generating one or more scalars from the diagonal matrix and from the basis vectors of the basis matrix U;

applying the one or more scalars to the received signal to project the signal of the source of interest: and determining $$y_s = u_1 \frac{1}{\sigma_1} u_1^T y - u_2 \frac{1}{\sigma_2} u_2^T y - \ldots u_{p-1} \frac{1}{\sigma_{p-1}} u_{p-1}^T y - u_p \frac{1}{\sigma_p} u_p^T y,$$

wherein $y_s$ is a projected said signal of the source of interest.

38. An apparatus for generating a projection from a received signal y, said received signal comprising H, a signal of a source of interest; S, the signals of all other sources and composed of vectors $s_1, s_2, s_3 \ldots, s_p$; and noise (n); the apparatus comprising:

means for determining a basis vector U;

means for storing elements of said basis vector U;

means for generating a diagonal matrix from stored said elements of the basis vector U;

means for generating one or more scalars from the diagonal matrix and from the basis vector U;

means for applying the one or more scalars to the received signal to project the signal of the source of interest; and means for determining $$y_s = u_1 \frac{1}{\sigma_1} u_1^T y - u_2 \frac{1}{\sigma_2} u_2^T y - \ldots u_{p-1} \frac{1}{\sigma_{p-1}} u_{p-1}^T y - u_p \frac{1}{\sigma_p} u_p^T y,$$

wherein $y_s$ is a projected said signal of the source of interest.

39. A system, comprising:

means for generating a first matrix from a received signal, wherein the received signal comprises a plurality of signals;

means for generating a second matrix from the first matrix, wherein the second matrix is a substantially orthogonal basis of the first matrix;

means for storing values used in generating the second matrix;

means for generating a diagonal matrix from stored said values;

means for generating one or more scalars from the diagonal matrix and from the second matrix; and means for multiplying the one or more scalars to the received signal to project the received signal substantially orthogonal to said plurality of signals.

40. A method, comprising:

generating a first matrix from a received signal, wherein the received signal comprises a plurality of signals;

generating a second matrix from the first matrix, wherein the second matrix is a substantially orthogonal basis of the first matrix;

storing values used in generating the second matrix;

generating a diagonal matrix from stored said values;

generating one or more scalars from the diagonal matrix and from the second matrix; and multiplying the one or more scalars to the received signal to project the received signal substantially orthogonal to said plurality of signals.

* * * * *

UNITED STATES PATENT AND TRADEMARK OFFICE
CERTIFICATE OF CORRECTION

PATENT NO. : 6,856,945 B2
DATED : February 15, 2005
INVENTOR(S) : John K. Thomas and Anand P. Narayan It is certified that error appears in the above-identified patent and that said Letters Patent is hereby corrected as shown below:

<u>Title page, Item [54] and Column 1, line 1,</u>
Title, should read -- METHOD AND APPARATUS FOR IMPLEMENTING PROJECTIONS IN SIGNAL PROCESSING APPLICATIONS --.

Signed and Sealed this

Fourth Day of October, 2005

JON W. DUDAS
*Director of the United States Patent and Trademark Office*